United States Patent
Wyndham et al.

(10) Patent No.: US 8,697,765 B2
(45) Date of Patent: Apr. 15, 2014

(54) POROUS CARBON-HETEROATOM-SILICON HYBRID INORGANIC/ORGANIC MATERIALS FOR CHROMATOGRAPHIC SEPARATIONS AND PROCESS FOR THE PREPARATION THEREOF

(75) Inventors: Kevin D. Wyndham, Douglas, MA (US); John E. O'Gara, Ashland, MA (US)

(73) Assignee: Waters Technologies Corporation, Milford, MA (US)

( * ) Notice: Subject to any disclaimer, the term of this patent is extended or adjusted under 35 U.S.C. 154(b) by 1032 days.

(21) Appl. No.: 12/446,871

(22) PCT Filed: Dec. 21, 2007

(86) PCT No.: PCT/US2007/026246
§ 371 (c)(1), (2), (4) Date: Oct. 21, 2009

(87) PCT Pub. No.: WO2008/085435
PCT Pub. Date: Jul. 17, 2008

(65) Prior Publication Data
US 2010/0076103 A1    Mar. 25, 2010

Related U.S. Application Data

(60) Provisional application No. 60/880,339, filed on Jan. 12, 2007.

(51) Int. Cl.
*C08G 18/32*    (2006.01)

(52) U.S. Cl.
USPC .......................................................... 521/154

(58) Field of Classification Search
None
See application file for complete search history.

(56) References Cited

U.S. PATENT DOCUMENTS

| | | | |
|---|---|---|---|
| 4,334,118 A | 6/1982 | Manning | |
| 6,599,951 B2 | 7/2003 | Zampini et al. | |
| 6,663,668 B1 * | 12/2003 | Chaouk et al. | 623/5.16 |
| 6,686,035 B2 | 2/2004 | Jiang et al. | |

OTHER PUBLICATIONS

ISR (PCT/ISA210) Issued in PCT/US2007/026246, Jul. 17, 2008, Waters Investments Limted.
Written Opinion (PCT/ISA210) Issued in PCT/US2007/026246, Jul. 17, 2008, Waters Investments Limited.

* cited by examiner

*Primary Examiner* — Randy Gulakowski
*Assistant Examiner* — Jeffrey Washville
(74) *Attorney, Agent, or Firm* — Edwards Wildman Palmer LLP; Nicholas J. DiCeglie, Jr.

(57) ABSTRACT

The present invention provides porous carbon-heteroatom-silicon inorganic/organic homogenous copolymeric hybrid materials, methods for their preparation, and uses thereof, e.g., as chromatographic separations materials.

32 Claims, No Drawings

POROUS CARBON-HETEROATOM-SILICON HYBRID INORGANIC/ORGANIC MATERIALS FOR CHROMATOGRAPHIC SEPARATIONS AND PROCESS FOR THE PREPARATION THEREOF

RELATED APPLICATION

This application is the U.S. national phase, pursuant to 35 U.S.C. §371, of PCT international application Ser. No. PCT/US2007/026246, filed Dec. 21, 2007, designating the United States and published in English on Jul. 17, 2008 as publication no. WO 2008/085435 A1, which claims priority to U.S. provisional application Ser. No. 60/880,339, filed Jan. 12, 2007. The entire contents of the aforementioned applications are incorporated herein by this reference.

BACKGROUND OF THE INVENTION

Packing materials for liquid chromatography (LC) are generally classified into two types: organic materials, e.g., poly-divinylbenzene, and inorganic materials, e.g., silica.

As stationary phases for HPLC, silica-based materials result in columns that do not show evidence of shrinking or swelling and are mechanically strong. However, limited hydrolytic stability is a drawback with silica-based columns, because silica may be readily dissolved under alkaline conditions, generally pH>8.0, leading to the subsequent collapse of the chromatographic bed. Additionally, the bonded phase on a silica surface may be removed from the surface under acidic conditions, generally pH<2.0, and eluted off the column by the mobile phase, causing loss of analyte retention.

On the other hand, many organic materials are chemically stable against strongly alkaline and strongly acidic mobile phases, allowing flexibility in the choice of mobile phase pH. However, organic chromatographic materials generally result in columns with low efficiency, leading to inadequate separation performance, particularly with low molecular-weight analytes. Furthermore, many organic chromatographic materials shrink and swell when the composition of the mobile phase is changed. In addition, most organic chromatographic materials do not have the mechanical strength of typical chromatographic silica.

In order to overcome the above-mentioned deficiencies while maintaining the beneficial properties of purely organic and purely inorganic materials, others have attempted to simply mix organic and inorganic materials. For example, others have previously attempted to produce such materials for optical sensors or gas separation membranes that are mixtures of organic polymers (e.g., poly(2-methyl-2-oxazoline), poly(N-vinylpyrrolidone), polystyrene, or poly(N,N-dimethylacrylamide) dispersed within silica. See, e.g., Chujo, *Polymeric Materials: Science & Engineering*, 84, 783 (2001); Tamaki, *Polymer Bull.*, 39, 303 (1997); and Chujo, *MRS Bull.*, 389 (May 2001). These materials, however, were not useful for any liquid based separation application because they are translucent and non-porous. As a result, these materials lack capacity as a separation material.

Still others have attempted to make materials that have inorganic and organic components covalently bound to each other. See, e.g., Feng, Q., *J. Mater. Chem.* 10, 2490-94 (2000), Feng, Q., *Polym. Preprints* 41, 515-16 (2000), Wei, Y., *Adv. Mater.* 12, 1448-50 (2000), Wei, Y. *J. Polym. Sci.* 18, 1-7 (2000). These materials, however, only contain very low amounts of organic material, i.e., less than 1% C, and as a result they function essentially as inorganic silica gels.

Furthermore, these materials are non-porous until they are ground to irregular particles and then extracted to remove template porogen molecules. Accordingly, it is not possible to make porous monolithic materials which have a useful capacity as a separation material. Irregularly-shaped particles are generally more difficult to pack than spherical particles. It is also known that columns packed with irregularly-shaped particles generally exhibit poorer packed bed stability than spherical particles of the same size. The template agents used in the synthesis of these materials are nonsurfactant optically active compounds, and the use of such compounds limits the range of porogen choices and increases their cost. The properties of these materials make them undesirable for use as LC packing materials.

SUMMARY OF THE INVENTION

The present invention provides a solution to the above-mentioned deficiencies. In particular, the present invention provides a novel porous carbon-heteroatom-silicon hybrid inorganic/organic material for chromatographic separations, processes for its preparation, and separations devices containing the chromatographic material. The materials of the invention incorporate a novel repeat unit, which is connected to other repeat units by a carbon-heteroatom-silicon bond. Additionally, the materials of the invention have increased chemical stability, increased mechanical stability, reduced swelling and reduced microporosity. Accordingly, the materials of the invention have a variety of uses. For example, the material of the invention may be used as a liquid chromatography stationary phase; a sequestering reagent; a solid support for combinatorial chemistry; a solid support for oligosaccharide, polypeptide, or oligonucleotide synthesis; a solid support for a biological assay; a capillary biological assay device for mass spectrometry; a template for a controlled large pore polymer film; a capillary chromatography stationary phase; an electrokinetic pump packing material; a polymer additive; a catalyst; or a packing material for a microchip separation device.

Thus, in one aspect, the invention provides a porous inorganic/organic homogenous copolymeric hybrid material, comprising two or more repeat units, wherein at least one repeat unit is an organosilane repeat unit D, wherein repeat unit D is selected from the group consisting of

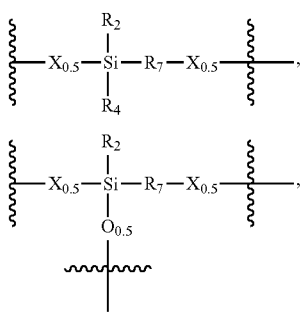

-continued

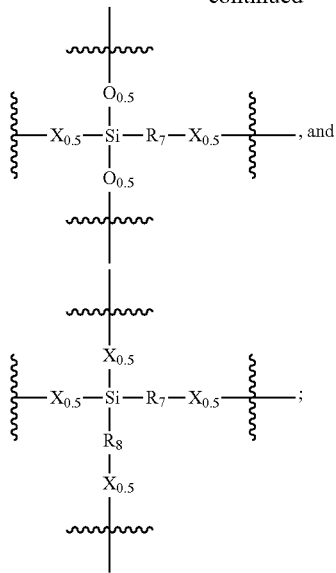

wherein $R_2$ and $R_4$ are each independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, or $C_5$-$C_{18}$ heteroaryl;

each $R_7$ or $R_8$ is independently $C_1$-$C_{18}$ alkyl, $C_2$-$C_{18}$ alkenyl, $C_2$-$C_{18}$ alkenylene, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ arylene, $C_5$-$C_{18}$ heteroaryl, or $C_5$-$C_{18}$ heteroarylene, wherein each of $R_7$ and $R_8$ may be optionally substituted;

X is O, $NR_A$, or $S(O)_q$;

$R_A$ is $C_1$-$C_6$ alkyl, $C_2$-$C_{18}$ alkenyl, $C_3$-$C_{18}$ cycloalkyl, $C_3$-$C_{18}$ heterocycloalkyl, $C_5$-$C_{18}$ aryl, or $C_5$-$C_{18}$ heteroaryl; and q is 0-2.

In one embodiment, the two or more repeat units are linked by at least one carbon-heteroatom-silicon linker. In another embodiment, the porous inorganic/organic homogenous copolymeric hybrid material of the invention has the formula $(A)_w(B)_x(C)_y(D)_z$ wherein the order of repeat units A, B, C, and D may be random, block, or a combination of random and block and wherein:

A is an organic repeat unit which is covalently bonded to one or more repeat units A, B, or D via an organic bond;

B is an organosiloxane repeat unit which is bonded to: one or more repeat units A, B, or D via an organic bond; one or more repeat units B, C, or D via an inorganic bond; or one or more repeat units D via a carbon-heteroatom-silicon bond;

C is an inorganic repeat unit which is bonded to: one or more repeat units B, C, or D via an inorganic bond; or one or more repeat units D via a carbon-heteroatom-silicon bond;

D is an organosilane repeat unit as defined in claim 1 and is bonded to: one or more repeat units A, B, or D via an organic bond; one or more repeat units B, C, or D via an inorganic bond; or one or more repeat units B, C, or D via a carbon-heteroatom-silicon bond;

w, x, and y are each independently positive numbers or zero, wherein w+x+y>0; and z is a positive number.

In a related embodiment, when w and x in the formula above are 0, the invention provides a material of the formula:

$(C)_y(D)_z$ wherein the order of repeat units C and D may be random, block, or a combination of random and block;

C is an inorganic repeat unit which is bonded to: one or more repeat units C or D via an inorganic bond; or one or more repeat units D via a carbon-heteroatom-silicon bond;

D is an organosilane repeat unit which is bonded to: one or more repeat units C or D via an inorganic bond; one or more repeat units C or D via a carbon-heteroatom-silicon bond; or one or more repeat units D via an organic bond; and y and z are positive numbers.

In certain embodiments, the materials of the invention may have unreacted end groups, e.g., SiOH, Si(OH)$_2$, or Si(OH)$_3$, or unpolymerized olefins.

Another aspect of the invention provides separation devices comprising the novel porous carbon-heteroatom-silicon hybrid inorganic/organic materials described herein.

Methods of preparation of such materials are contemplated by the invention. Thus, in yet another aspect, the invention provides a method of preparing a porous inorganic/organic homogenous copolymeric hybrid material comprising two or more repeat units, wherein at least one repeat unit is an organosilane repeat unit D (previously described), comprising the steps of (a) partially condensing an organic olefin, an alkenyl functionalized silane, an alkoxysilane, or a heterocyclic silane, or mixtures thereof, (b) adding a heterocyclic silane, and (c) further reacting the heterocyclic silane with the partially condensed polymer of step (a) to thereby prepare a porous inorganic/organic homogenous copolymeric hybrid material comprising a carbon-heteroatom-silicon functionality.

In a related aspect, the invention provides a method of preparing a porous inorganic/organic homogenous copolymeric hybrid material comprising two or more repeat units, wherein at least one repeat unit is an organosilane repeat unit D (previously described), comprising the steps of (a) preparing a polyoligomeric silaxane (POS) by partial condensation of tetraalkoxylsilane, (b) adding a heterocyclic silane, and (c) further reacting the heterocyclic silane with the POS to thereby prepare a porous inorganic/organic homogenous copolymeric hybrid material, comprising a carbon-heteroatom-silicon functionality.

In another related aspect, the invention provide a method of preparing a porous inorganic/organic homogenous copolymeric hybrid material comprising two or more repeat units, wherein at least one repeat unit is an organosilane repeat unit D (previously described), comprising the steps of (a) preparing a polyoligomeric silaxane (POS) by partial condensation of tetraalkoxylsilane, (b) adding a heterocyclic silane, and (c) further reacting the heterocyclic silane with the POS to thereby prepare a porous inorganic/organic homogenous copolymeric hybrid material, comprising a carbon-heteroatom-silicon functionality; wherein the heterocyclic silane is selected from the group consisting of

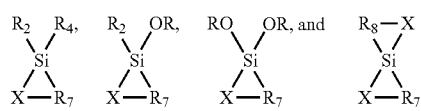

each R is independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, $C_6$-$C_{18}$ aralkyl, $C_6$-$C_{18}$ heteroaralkyl, —Si($R^c$)$_4$, —C(O)$R^c$, —C(S)$R^c$, —C(NR)$R^c$, —S(O)$R^c$, —S(O)$_2R^c$, —P(O)$R^cR^c$, or —P(S)$R^cR^c$;

each $R^c$ is independently, H, $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, —O$C_1$-$C_{18}$ alkyl; —O$C_5$-$C_{18}$ aryl; —O$C_3$-$C_{18}$ heterocycloalkyl, —O$C_5$-$C_{18}$ heteroaryl, —NH$C_1$-$C_{18}$ alkyl; or —N($C_1$-$C_{18}$ alkyl)$_2$;

$R_2$ and $R_4$ are each independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, or $C_5$-$C_{18}$ heteroaryl;

each $R_7$ or $R_8$ is independently $C_1$-$C_{18}$ alkyl, $C_2$-$C_{18}$ alkenyl, $C_2$-$C_{18}$ alkenylene, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ arylene, $C_5$-$C_{18}$ heteroaryl, or $C_5$-$C_{18}$ heteroarylene, wherein each of $R_7$ and $R_8$ may be optionally substituted;

X is O, $NR_A$, or $S(O)_q$;

$R_A$ is $C_1$-$C_6$ alkyl, $C_3$-$C_{18}$ cycloalkyl, $C_3$-$C_{18}$ heterocycloalkyl, $C_5$-$C_{18}$ aryl, or $C_5$-$C_{18}$ heteroaryl; and q is 0-2.

In another aspect, the invention provides a method of preparing a porous inorganic/organic homogenous copolymeric hybrid material of the formula:

$$(A)_w(B)_x(C)_y(D)_z$$

wherein the order of repeat units A, B, C, and D may be random, block, or a combination of random and block; and wherein A is an organic repeat unit which is covalently bonded to one or more repeat units A, B, or D via an organic bond;

B is an organosiloxane repeat unit which is bonded to: one or more repeat units A, B, or D via an organic bond; one or more repeat units B, C, or D via an inorganic bond; or one or more repeat unit D via a carbon-heteroatom-silicon bond;

C is an inorganic repeat unit which is bonded to: one or more repeat units B, C, or D via an inorganic bond; or one or more repeat unit D via a carbon-heteroatom-silicon bond;

D is an organosilane repeat unit which is bonded to one or more repeat units A, B, or D via an organic bond; bonded to one or more repeat units B, C, or D via an inorganic bond; or one or more repeat units B, C, or D via a carbon-heteroatom-silicon bond;

w, x, and y are positive numbers or zero; wherein w+x+y>0, z is a positive number;

the method comprising the steps of (a) partially condensing an organic olefin, an alkenyl functionalized silane, an alkoxysilane, or a heterocyclic silane, or mixtures thereof, (b) adding a heterocyclic silane, and (c) further reacting the heterocyclic silane with the partially condensed polymer of step (a) to thereby prepare a porous inorganic/organic homogenous copolymeric hybrid material comprising a carbon-heteroatom-silicon functionality.

In yet another aspect, the invention provides a method of preparing a porous inorganic/organic homogenous copolymeric hybrid material of the formula:

$$(C)_y(D)_z$$

wherein the order of repeat units C and D may be random, block, or a combination of random and block; and wherein C is an inorganic repeat unit which is bonded to: one or more repeat units C or D via an inorganic bond; or one or more repeat units D via a carbon-heteroatom-silicon bond;

D is an organosilane repeat unit which is bonded to: one or more repeat units C or D via an inorganic bond; one or more repeat units C or D via a carbon-heteroatom-silicon bond; or one or more repeat units D via an organic bond, and y and z are positive numbers;

the method comprising the steps of (a) preparing a polyoligomeric silaxane (POS) by partial condensation of a tetraalkoxylsilane, (b) adding a heterocyclic silane, and (c) further reacting the heterocyclic silane with the POS to thereby prepare a porous inorganic/organic homogenous copolymeric hybrid material, comprising a carbon-heteroatom-silicon functionality.

Other aspects, embodiments and features of the invention will become apparent form the following detailed description of the invention.

DETAILED DESCRIPTION OF THE INVENTION

Definitions

The present invention will be more fully illustrated by reference to the definitions set forth below.

As used herein, the term "porous inorganic/organic homogenous copolymeric hybrid material" includes materials comprising inorganic repeat units (e.g., comprising O—Si—O bonds between repeat units), organic repeat units (e.g., comprising C—C bonds between repeat units), and mixed organic-inorganic repeat units (e.g., comprising both C—C and O—Si—O bonds between repeat units).

The term "porous" indicates that the microscopic structure of the material contains pores of a measurable volume, so that the materials can be used, for example, as solid supports in chromatography.

The term "inorganic/organic copolymeric hybrid" indicates that the material comprises a copolymer of organic, inorganic, and mixed organic/inorganic repeat units.

The term "homogenous" indicates that the structure of the material at the chemical level is substantially interconnected via chemical bonds, as opposed to the prior art materials that simply comprise mixtures of discrete organic and inorganic materials.

The term "hybrid" refers to a material having chemical bonds among inorganic and organic repeat units of a composite material thereby forming a matrix throughout the material itself, as opposed to a mixture of discrete chemical compounds.

Polyorganoalkoxysiloxane (POS) and polyalkylalkoxysiloxane (PAS) are large molecules, either linear or preferably three-dimensional networks, that are formed by the condensation of silanols, where the silanols are formed, e.g., by hydrolysis of halo- or alkoxy-substituted silanes.

As used herein, the term "protecting group" means a protected functional group which may be intended to include chemical moieties that shield a functional group from chemical reaction or interaction such that upon later removal ("deprotection") of the protecting group, the functional group can be revealed and subjected to further chemistry. The term also includes a functional group which that does not interfere with the various polymerization and condensation reactions used in the synthesis of the materials of the invention, but which that may be converted after synthesis of the material into a functional group that may itself be further derivatized. For example, an organic monomer reagent A may contain an aromatic nitro group which that would not interfere with the polymerization or condensation reactions. However, after these polymerization and condensation reactions have been carried out, the nitro group may be reduced to an amino group (e.g., an aniline), which itself may then be subjected to further derivatization by a variety of means known in the art. In this manner, additional functional groups may be incorporated into the material after the syntheses of the material itself. See generally, Greene, T. W. and Wuts, P. G. M. "Protective Groups in Organic Synthesis," Second Edition, Wiley, 1991. In some cases, preferable protecting group strategies do not involve the use of heavy metals (e.g., transition metals) in the protection or deprotection step as these metals may be difficult to remove from the material completely.

The porous inorganic/organic homogenous copolymeric hybrid particles and materials possess both organic groups and silanol groups which may additionally be substituted or derivatized with a surface modifier. "Surface modifiers" include (typically) organic groups which impart a certain chromatographic functionality to a chromatographic stationary phase. Surface modifiers such as disclosed herein are attached to the base material, e.g., via derivatization or coating and later crosslinking, imparting the chemical character of the surface modifier to the base material. In one embodiment, the organic groups of the hybrid materials react to form an organic covalent bond with a surface modifier. The modifiers may form an organic covalent bond to the material's organic group via a number of mechanisms well known in organic and polymer chemistry including, but not limited to, nucleophilic, electrophilic, cycloaddition, free-radical, carbene, nitrene, and carbocation reactions. Organic covalent bonds are defined to involve the formation of a covalent bond between the common elements of organic chemistry including, but not limited to, hydrogen, boron, carbon, nitrogen, oxygen, silicon, phosphorus, sulfur, and the halogens. In addition, carbon-silicon and carbon-oxygen-silicon bonds are defined as organic covalent bonds, whereas silicon-oxygen-silicon bonds are not defined as organic covalent bonds. In general, the porous inorganic/organic homogenous copolymeric hybrid particles may be modified by an organic group surface modifier, a silanol group surface modifier, a polymeric coating surface modifier, and combinations of the aforementioned surface modifiers.

The term "aliphatic group" includes organic compounds characterized by straight or branched chains, typically having between 1 and 22 carbon atoms. Aliphatic groups include alkyl groups, alkenyl groups and alkynyl groups. In complex structures, the chains may be branched or cross-linked.

Alkyl groups include saturated hydrocarbons having one or more carbon atoms, including straight-chain alkyl groups and branched-chain alkyl groups. Such hydrocarbon moieties may be substituted on one or more carbons with, for example, a halogen, a hydroxyl, a thiol, an amino, an alkoxy, an alkylcarboxy, an alkylthio, or a nitro group. Unless the number of carbons is otherwise specified, "lower aliphatic" as used herein means an aliphatic group, as defined above (e.g., lower alkyl, lower alkenyl, lower alkynyl), but having from one to six carbon atoms. Representative of such lower aliphatic groups, e.g., lower alkyl groups, are methyl, ethyl, n-propyl, isopropyl, 2-chloropropyl, n-butyl, sec-butyl, 2-aminobutyl, isobutyl, tert-butyl, 3-thiopentyl, and the like.

As used herein, the term "nitro" means $-NO_2$; the term "halogen" designates $-F$, $-Cl$, $-Br$ or $-I$; the term "thiol" means SH; and the term "hydroxyl" means $-OH$. Thus, the term "alkylamino" as used herein means an alkyl group, as defined above, having an amino group attached thereto. Suitable alkylamino groups include groups having 1 to about 12 carbon atoms, preferably from 1 to about 6 carbon atoms.

The term "alkylthio" refers to an alkyl group, as defined above, having a sulfhydryl group attached thereto. Suitable alkylthio groups include groups having 1 to about 12 carbon atoms, preferably from 1 to about 6 carbon atoms.

The term "alkylcarboxyl" as used herein means an alkyl group, as defined above, having a carboxyl group attached thereto.

The term "alkoxy" as used herein means an alkyl group, as defined above, having an oxygen atom attached thereto. Representative alkoxy groups include groups having 1 to about 12 carbon atoms, preferably 1 to about 6 carbon atoms, e.g., methoxy, ethoxy, propoxy, tert-butoxy and the like.

The terms "alkenyl" and "alkynyl" refer to unsaturated aliphatic groups analogous to alkyls, but which contain at least one double or triple bond respectively. Suitable alkenyl and alkynyl groups include groups having 2 to about 12 carbon atoms, preferably from 1 to about 6 carbon atoms.

The term "alicyclic group" or "cycloalkyl" includes closed ring structures of three or more carbon atoms. Such groups include cycloparaffins or naphthenes which are saturated cyclic hydrocarbons, cycloolefins which are unsaturated with two or more double bonds, and cycloacetylenes which have a triple bond. They do not include aromatic groups. Examples of cycloparaffins include cyclopropane, cyclohexane, and cyclopentane. Examples of cycloolefins include cyclopentadiene and cyclooctatetraene. Alicyclic groups also include fused ring structures and substituted alicyclic groups such as alkyl substituted alicyclic groups. In the instance of the alicyclics such substituents may further comprise a lower alkyl, a lower alkenyl, a lower alkoxy, a lower alkylthio, a lower alkylamino, a lower alkylcarboxyl, a nitro, a hydroxyl, $-CF_3$, $-CN$, or the like.

The term "heterocyclic group" includes closed ring structures in which one or more of the atoms in the ring is an element other than carbon, for example, nitrogen, sulfur, or oxygen. Heterocyclic groups may be saturated or unsaturated and heterocyclic groups, herein including heterocycloalkyl, heteroaromatic, or heteroalicyclic, such as pyrrole and furan may have aromatic character. They include fused ring structures such as quinoline and isoquinoline. Other examples of heterocyclic groups include pyridine and purine. Heterocyclic groups may also be substituted at one or more constituent atoms with, for example, a halogen, a lower alkyl, a lower alkenyl, a lower alkoxy, a lower alkylthio, a lower alkylamino, a lower alkylcarboxyl, a nitro, a hydroxyl, $-CF_3$, $-CN$, or the like. Suitable heteroaromatic, heterocycloalkyl, and heteroalicyclic groups generally will have 1 to 3 separate or fused rings with 3 to about 8 members per ring and one or more N, O or S atoms, e.g., coumarinyl, quinolinyl, pyridyl, pyrazinyl, pyrimidyl, furyl, pyrrolyl, thienyl, thiazolyl, oxazolyl, imidazolyl, indolyl, benzofuranyl, benzothiazolyl, tetrahydrofuranyl, tetrahydropyranyl, piperidinyl, morpholino and pyrrolidinyl.

The term "aromatic group" or "aryl" includes unsaturated cyclic hydrocarbons containing one or more rings. Aromatic groups include 5- and 6-membered single-ring groups which may include from zero to four heteroatoms, for example, benzene, pyrrole, furan, thiophene, imidazole, oxazole, thiazole, triazole, pyrazole, pyridine, pyrazine, pyridazine and pyrimidine, and the like. The aromatic ring may be substituted at one or more ring positions with, for example, a halogen, a lower alkyl, a lower alkenyl, a lower alkoxy, a lower alkylthio, a lower alkylamino, a lower alkylcarboxyl, a nitro, a hydroxyl, $-CF_3$, $-CN$, or the like.

The term "alkyl" includes saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has 30 or fewer carbon atoms in its backbone, e.g., $C_1$-$C_{30}$ for straight chain or $C_3$-$C_{30}$ for branched chain. In certain embodiments, a straight chain or branched chain alkyl has 20 or fewer carbon atoms in its backbone, e.g., $C_1$-$C_{20}$ for straight chain or $C_3$-$C_{20}$ for branched chain, and more preferably 18 or fewer. Likewise, preferred cycloalkyls have from 4-10 carbon atoms in their ring structure, and more preferably have 4-7 carbon atoms in the ring structure.

The term "lower alkyl" refers to alkyl groups having from 1 to 6 carbons in the chain, and to cycloalkyls having from 3 to 6 carbons in the ring structure.

Moreover, the term "alkyl" (including "lower alkyl") as used throughout the specification and claims includes both "unsubstituted alkyls" and "substituted alkyls," the latter of which refers to alkyl moieties having substituents replacing a hydrogen on one or more carbons of the hydrocarbon backbone. Such substituents may include, for example, halogen, hydroxyl, alkylcarbonyloxy, arylcarbonyloxy, alkoxycarbonyloxy, aryloxycarbonyloxy, carboxylate, alkylcarbonyl, alkoxycarbonyl, aminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), amidino, imino, sulfhydryl, alkylthio, arylthio, thiocarboxylate, sulfate, sulfonato, sulfamoyl, sulfonamido, nitro, trifluoromethyl, cyano, azido, heterocyclyl, aralkyl, or an aromatic or heteroaromatic moiety. It will be understood by those skilled in the art that the moieties substituted on the hydrocarbon chain may themselves be substituted, if appropriate. Cycloalkyls may be further substituted, e.g., with the substituents described above.

An "aralkyl" moiety is an alkyl substituted with an aryl, e.g., having 1 to 3 separate or fused rings and from 6 to about 18 carbon ring atoms, e.g., phenylmethyl (benzyl). A "heteroaralkyl" moiety herein refers to a heteroalkyl substituted with an aryl, or an alkyl substituted with a heteroaryl group.

The term "aryl" includes 5- and 6-membered single-ring aromatic groups that may include from zero to four heteroatoms, for example, unsubstituted or substituted benzene, pyrrole, furan, thiophene, imidazole, oxazole, thiazole, triazole, pyrazole, pyridine, pyrazine, pyridazine and pyrimidine, and the like. Aryl groups also include polycyclic fused aromatic groups such as naphthyl, quinolyl, indolyl, and the like. The aromatic ring may be substituted at one or more ring positions with such substituents, e.g., as described above for alkyl groups. Suitable aryl groups include unsubstituted and substituted phenyl groups.

The term "aryloxy" as used herein means an aryl group, as defined above, having an oxygen atom attached thereto.

The term "aralkoxy" as used herein means an aralkyl group, as defined above, having an oxygen atom attached thereto. Suitable aralkoxy groups have 1 to 3 separate or fused rings and from 6 to about 18 carbon ring atoms, e.g., O-benzyl.

The term "amino," as used herein, refers to an unsubstituted or substituted moiety of the formula —$NR_aR_b$, in which $R_a$ and $R_b$ are each independently hydrogen, alkyl, aryl, or heterocyclyl, or $R_a$ and $R_b$, taken together with the nitrogen atom to which they are attached, form a cyclic moiety having from 3 to 8 atoms in the ring. Thus, the term "amino" includes cyclic amino moieties such as piperidinyl or pyrrolidinyl groups, unless otherwise stated. An "amino-substituted amino group" refers to an amino group in which at least one of $R_a$ and $R_b$, is further substituted with an amino group.

The terms alkylene, alkeneylene, alkynylene, arylene, heteroarylene, cycloalkylene, and so forth herein refer to groups that are divalent and substituted with at least two additional substituents, e.g., arylene refers to a disubstituted aryl ring.

The term "porogen" refers to a pore forming material, that is a chemical material dispersed in a material as it is formed that is subsequently removed to yield pores or voids in the material.

The term "end capping" a chemical reaction step in which a resin that has already been synthesized, but that may have residual unreacted groups (e.g., silanol groups in the case of a silicon-based inorganic resin) are passivated by reaction with a suitable reagent. For example, again in the case of silicon-based inorganic resins, such silanol groups may be methylated with a methylating reagent such as hexamethyldisilazane.

Hybrid Materials of the Invention

In certain aspects, the invention provides a porous inorganic/organic homogenous copolymeric hybrid material, comprising two or more repeat units, wherein at least one repeat unit is an organosilane repeat unit D, selected from the group consisting of

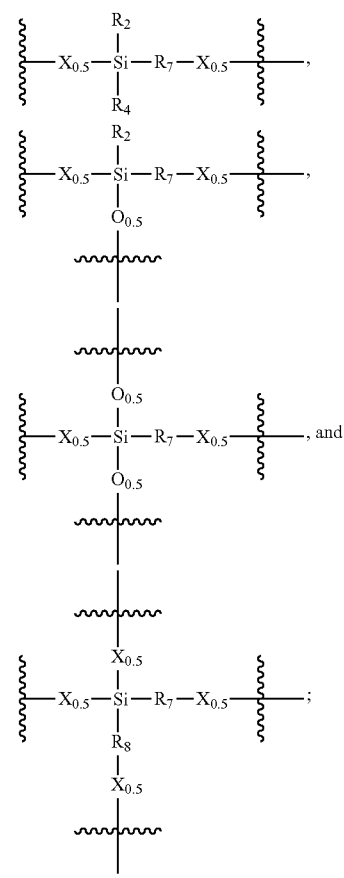

wherein $R_2$ and $R_4$ are each independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, or $C_5$-$C_{18}$ heteroaryl;

each $R_7$ or $R_8$ is independently $C_1$-$C_{18}$ alkyl, $C_2$-$C_{18}$ alkenyl, $C_2$-$C_{18}$ alkenylene, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ arylene, $C_5$-$C_{18}$ heteroaryl, or $C_5$-$C_{18}$ heteroarylene, wherein each of $R_7$ and $R_8$ may be optionally substituted;

X is O, $NR_4$, or $S(O)_q$;

$R_A$ is $C_1$-$C_6$ alkyl, $C_2$-$C_{18}$ alkenyl, $C_3$-$C_{18}$ cycloalkyl, $C_3$-$C_{18}$ heterocycloalkyl, $C_5$-$C_{18}$ aryl, or $C_5$-$C_{18}$ heteroaryl; and q is 0-2.

In one embodiment, the two or more repeat units are linked by at least one carbon-heteroatom-silicon linker. In a further embodiment, the heteroatom in the carbon-heteroatom-silicon linker is selected from O, N, or S.

In another embodiment, the invention provides a porous inorganic/organic homogenous copolymeric hybrid material of formula I $$(A)_w(B)_x(C)_y(D)_z;\qquad\text{(Formula I)}$$

wherein the order of repeat units A, B, C, and D may be random, block, or a combination of random and block and wherein:

A is an organic repeat unit which is covalently bonded to one or more repeat units A, B, or D via an organic bond;

B is an organosiloxane repeat unit which is bonded to: one or more repeat units A, B, or D via an organic bond; one or more repeat units B, C, or D via an inorganic bond; or one or more repeat unit D via a carbon-heteroatom-silicon bond;

C is an inorganic repeat unit which is bonded to: one or more repeat units B, C, or D via an inorganic bond; or one or more repeat unit D via a carbon-heteroatom-silicon bond;

D is an organosilane repeat unit as defined above and is bonded to: one or more repeat units A, B, or D via an organic bond; one or more repeat units B, C, or D via an inorganic bond; or one or more repeat units B, C, or D via a carbon-heteroatom-silicon bond;

w, x, and y are each independently positive numbers or zero, wherein w+x+y>0; and z is a positive number.

In yet another embodiment, the invention provides a porous inorganic/organic homogenous copolymeric hybrid material of Formula II, which is a material of Formula I, wherein w and x are 0, providing a material of formula II:

$$(C)_y(D)_z;\qquad\text{(Formula II)}$$

wherein the order of repeat units C and D may be random, block, or a combination of random and block;

C is an inorganic repeat unit which is bonded to: one or more repeat units C or D via an inorganic bond; or one or more repeat units D via a carbon-heteroatom-silicon bond;

D is an organosilane repeat unit as defined above, which is bonded to: one or more repeat units C or D via an inorganic bond; one or more repeat units C or D via a carbon-heteroatom-silicon bond; or one or more repeat units D via an organic bond; and y and z are positive numbers.

In certain embodiments, the invention provides a material wherein D is bonded to one or more repeat units of B, C, or D via a carbon-heteroatom-silicon bond. In other embodiments, D is bonded to one or more repeat units of B, C, or D via a carbosiloxane bond (C—O—Si).

The invention also embodies the material above, wherein the silicon atom of the group D monomer is attached to the heteroatom of the carbon-heteroatom-silicon linker.

In another embodiment, the invention provides a material, wherein the silicon atom of the group D monomer is attached to a carbon atom.

In still another embodiment, the invention provides a material, wherein the carbon-heteroatom-silicon functionality is incorporated into the material via a ring opening reaction of a heterocyclic silane compound. In one embodiment, the heterocyclic silane is selected from the group consisting of

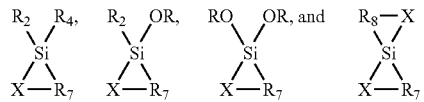

wherein each R is independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, $C_6$-$C_{18}$ aralkyl, $C_6$-$C_{18}$ heteroaralkyl, —Si($R^c$)$_4$, —C(O)$R^c$, —C(S)$R^c$, —C(NR)$R^c$, —S(O)$R^c$, —S(O)$_2R^c$, —P(O)$R^cR^c$, or —P(S)$R^cR^c$;

each $R^c$ is independently, H, $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, —O$C_1$-$C_{18}$ alkyl; —O$C_5$-$C_{18}$ aryl; —O$C_3$-$C_{18}$ heterocycloalkyl, —O$C_5$-$C_{18}$ heteroaryl, —NH$C_1$-$C_{18}$ alkyl; or —N($C_1$-$C_{18}$ alkyl)$_2$;

$R_2$ and $R_4$ are each independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, or $C_5$-$C_{18}$ heteroaryl;

each $R_7$ or $R_8$ is independently $C_1$-$C_{18}$ alkyl, $C_2$-$C_{18}$ alkenyl, $C_2$-$C_{18}$ alkenylene, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ arylene, $C_5$-$C_{18}$ heteroaryl, or $C_5$-$C_{18}$ heteroarylene, wherein each of $R_7$ and $R_8$ may be optionally substituted;

X is O, $NR_A$, or $S(O)_q$;

$R_A$ is $C_1$-$C_6$ alkyl, $C_3$-$C_{18}$ cycloalkyl, $C_3$-$C_{18}$ heterocycloalkyl, $C_5$-$C_{18}$ aryl, or $C_5$-$C_{18}$ heteroaryl; and q is 0-2.

In certain embodiments, the invention provides a material of formula I, wherein A is a substituted ethylene group, B is a oxysilyl-substituted alkylene group, C is a oxysilyl group, and D is a silyl group.

Repeat Units

Repeat unit "A" may be derived from a variety of organic monomer reagents possessing one or more polymerizable moieties, capable of undergoing polymerization, e.g., a free radical-mediated polymerization. "A" monomers may be oligomerized or polymerized by a number of processes and mechanisms including, but not limited to, chain addition and step condensation processes, radical, anionic, cationic, ring-opening, group transfer, metathesis, and photochemical mechanisms. In one embodiment, A is selected from the group consisting of

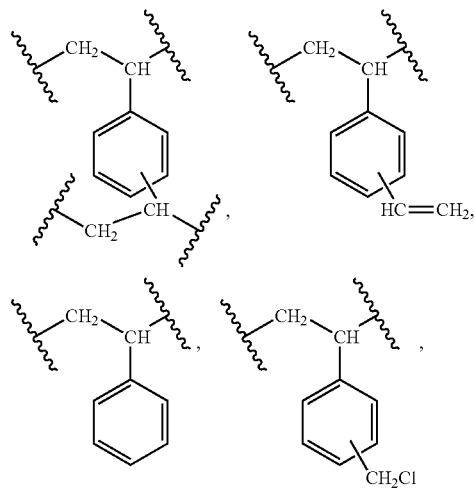

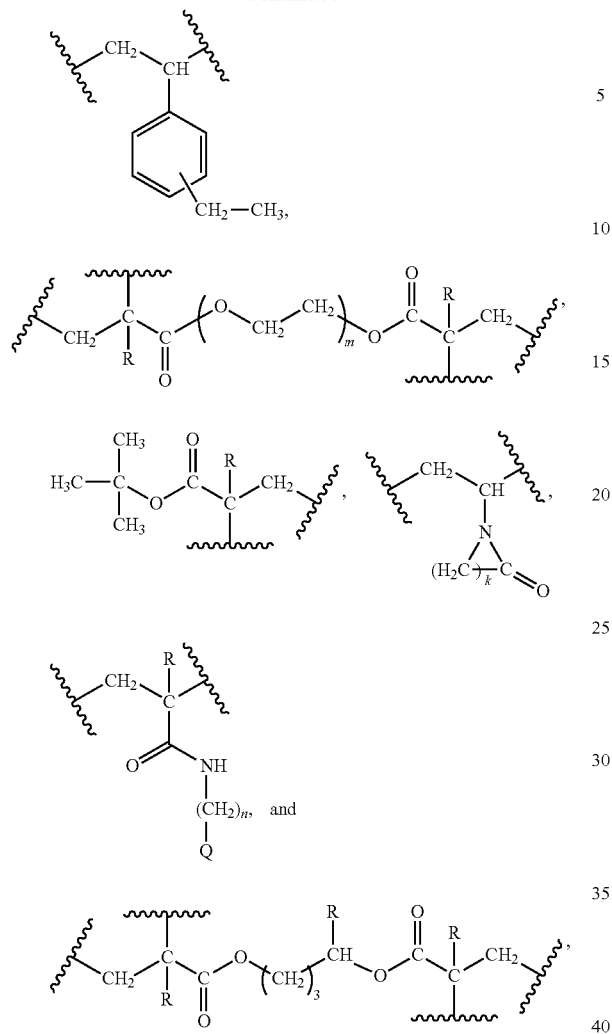

wherein
each R is independently H or a $C_1$-$C_{10}$ alkyl group;
k is an integer from 3-6;
m is an integer of from 1 to 20;
n is an integer of from 0 to 10; and
Q is hydrogen, $N(C_{1-6}alkyl)_3$, $N(C_{1-6}alkyl)_2(C_{1-6}alkylene-SO_3)$, or $C(C_{1-6}hydroxy\ alkyl)_3$.

In a further embodiment of repeat unit A, each R is independently hydrogen, methyl, ethyl, or propyl.

Repeat unit "B" may be derived from several mixed organic-inorganic monomer reagents possessing two or more different polymerizable moieties, capable of undergoing polymerization, e.g., a free radical-mediated (organic) and hydrolytic (inorganic) polymerization. Such "B" repeat units are organosiloxanes. "B" monomers may be oligomerized or polymerized by a number of processes and mechanisms including, but not limited to, chain addition and step condensation processes, radical, anionic, cationic, ring-opening, group transfer, metathesis, and photochemical mechanisms. In another embodiment, the invention provides a material of formula I, wherein B is selected from the group consisting of

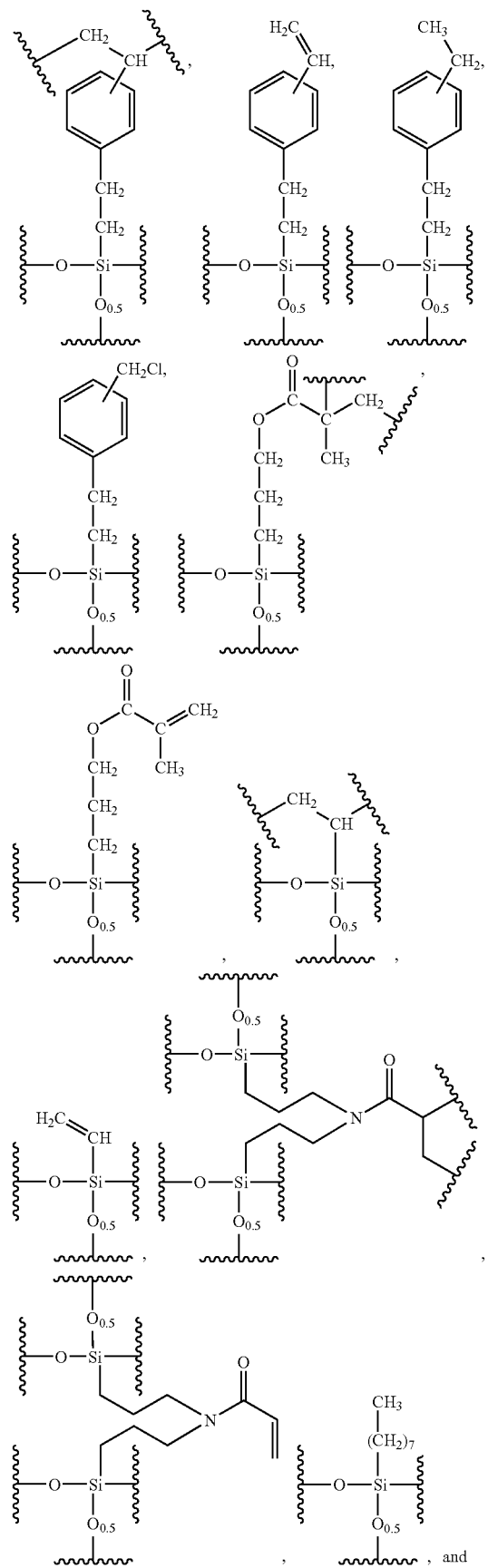

-continued

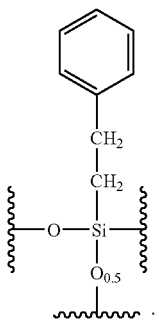

Repeat unit "C" may be an inorganic repeat unit. In one embodiment, the invention provides a material, wherein C is

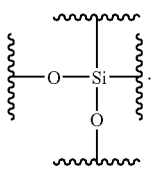

Repeat unit "D" may be an organosilane, derived from a heterocyclic silane, and is selected from the group consisting of

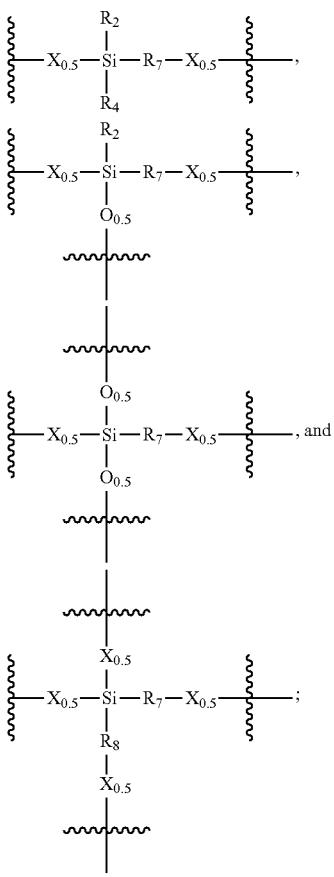

wherein $R_2$ and $R_4$ are each independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, or $C_5$-$C_{18}$ heteroaryl;

each $R_7$ or $R_8$ is independently $C_1$-$C_{18}$ alkyl, $C_2$-$C_{18}$ alkenyl, $C_2$-$C_{18}$ alkenylene, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ arylene, $C_5$-$C_{18}$ heteroaryl, or $C_5$-$C_{18}$ heteroarylene, wherein each of $R_7$ and $R_8$ may be optionally substituted;

X is O, $NR_4$, or $S(O)_q$;

$R_A$ is $C_1$-$C_6$ alkyl, $C_2$-$C_{18}$ alkenyl, $C_3$-$C_{18}$ cycloalkyl, $C_3$-$C_{18}$ heterocycloalkyl, $C_5$-$C_{18}$ aryl, or $C_5$-$C_{18}$ heteroaryl; and q is 0-2.

Bonds

In one embodiment, the invention provides a material wherein organic bonds are formed via chain addition. In a further embodiment, the organic bonds are formed between an organic olefin monomer and an alkenyl-functionalized silane monomer. In another further embodiment, the organic bonds are formed between an organic olefin monomer and an organic olefin monomer. In still another further embodiment, the organic bonds are formed between an organic olefin monomer and a heterocyclic silane monomer.

In other embodiments, the invention provides a material wherein the organic bonds are formed between an alkenyl-functionalized silane monomer and an alkenyl-functionalized silane monomer. In a further embodiment, the organic bonds are formed between an alkenyl-functionalized silane monomer and a heterocyclic silane monomer. In another further embodiment, the organic bonds are formed between a heterocyclic silane monomer and a heterocyclic silane monomer.

In certain embodiments, the invention provides a material wherein inorganic bonds are formed via step condensation. In a further embodiment, the inorganic bonds are formed between an alkenyl-functionalized silane monomer and an alkoxy silane monomer. In another further embodiment, the inorganic bonds are formed between an alkenyl-functionalized silane monomer and an alkenyl-functionalized silane monomer. In other embodiments, the inorganic bonds are formed between an alkenyl-functionalized silane monomer and a heterocyclic silane monomer. In still another embodiment, the inorganic bonds are formed between an alkoxy silane monomer and an alkoxy silane monomer. In yet another embodiment, the inorganic bonds are formed between an alkoxy silane monomer and a heterocyclic silane monomer. In other embodiments, the inorganic bonds are formed between a heterocyclic silane monomer and a heterocyclic silane monomer.

In another embodiment, the invention provides a material wherein carbon-heteroatom-silicon bonds are formed via ring opening. In a further embodiment, the ring opening bonds are formed between an alkenyl-functionalized silane monomer and a heterocyclic silane monomer. In another further embodiment, the ring opening bonds are formed between an alkoxy silane monomer and a heterocyclic silane monomer. In still another further embodiment, the ring opening bonds are formed between a heterocyclic silane monomer and a heterocyclic silane monomer.

Monomers

In certain embodiments, the invention provides a porous inorganic/organic homogenous copolymeric hybrid material, comprising organic bonds formed between an organic olefin monomer and a heterocyclic silane monomer, wherein the organic olefin monomer is selected from the group consisting of divinylbenzene, styrene, vinylbenzylchloride, ethylene glycol dimethacrylate, 1-vinyl-2-pyrrolidinone, N-vinylcaprolactam, tert-butylmethacrylate, acrylamide, methacrylamide, N,N'-(1,2-dihydroxyethylene)bisacrylamide, N,N'- ethylenebisacrylamide, N,N'-methylenebisacrylamide, butyl acrylate, ethyl acrylate, methyl acrylate, 2-(acryloxy)-2-hydroxypropyl methacrylate, 3-(acryloxy)-2-hydroxypropyl methacrylate, trimethylolpropane triacrylate, trimethylolpropane ethoxylate triacrylate, tris[(2-acryloyloxy)ethyl]isocyanurate, acrylonitrile, methacrylonitrile, itaconic acid, methacrylic acid, trimethylsilylmethacrylate, N-[tris(hydroxymethyl)methyl]acrylamide, (3-acrylamidopropyl) trimethylammonium chloride, [3-(methacryloylamino)propyl]dimethyl(3-sulfopropyl)ammonium hydroxide inner salt,

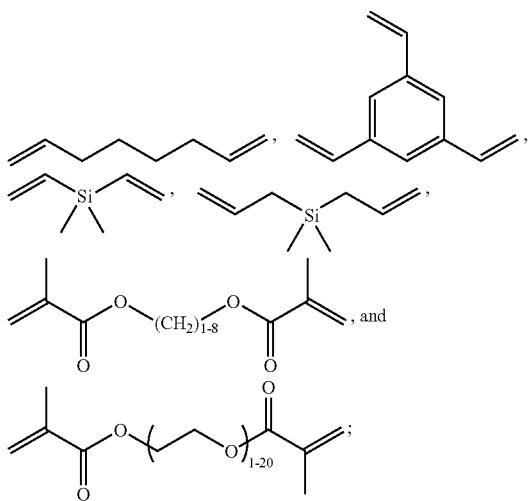

and the heterocyclic silane is selected from group consisting of:

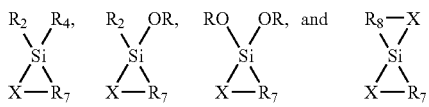

wherein each R is independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, $C_6$-$C_{18}$ aralkyl, $C_6$-$C_{18}$ heteroaralkyl, —Si($R^c$)$_4$, —C(O)$R^c$, —C(S)$R^c$, —C(NR)$R^c$, —S(O)$R^c$, —S(O)$_2R^c$, —P(O)$R^cR^c$, or —P(S)$R^cR^c$;

each $R^c$ is independently, H, $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, —O$C_1$-$C_{18}$ alkyl; —O$C_5$-$C_{18}$ aryl; —O$C_3$-$C_{18}$ heterocycloalkyl, —O$C_5$-$C_{18}$ heteroaryl, —NH$C_1$-$C_{18}$ alkyl; or —N($C_1$-$C_{18}$ alkyl)$_2$;

$R_2$ and $R_4$ are each independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, or $C_5$-$C_{18}$ heteroaryl;

each $R_7$ or $R_8$ is independently $C_1$-$C_{18}$ alkyl, $C_2$-$C_{18}$ alkenyl, $C_2$-$C_{18}$ alkenylene, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ arylene, $C_5$-$C_{18}$ heteroaryl, or $C_5$-$C_{18}$ heteroarylene, wherein each of $R_7$ and $R_8$ may be optionally substituted;

X is O, $NR_A$, or $S(O)_q$;

$R_A$ is $C_1$-$C_6$ alkyl, $C_3$-$C_{18}$ cycloalkyl, $C_3$-$C_{18}$ heterocycloalkyl, $C_5$-$C_{18}$ aryl, or $C_5$-$C_{18}$ heteroaryl; and q is 0-2.

In another embodiment, the invention provides a porous inorganic/organic homogenous copolymeric hybrid material, comprising organic bonds formed between an alkenyl-functionalized silane monomer and a heterocyclic silane monomer, wherein the alkenyl-functionalized silane monomer is selected from the group consisting of methacryloxypropyl trimethoxysilane, methacryloxypropyl triethoxysilane, vinyltriethoxysilane, vinyltrimethoxysilane, N-(3-acryloxy-2-hydroxypropyl)-3-aminopropyl triethoxysilane, (3-acryloxypropyl)trimethoxysilane, O-(methacryloxyethyl)-N-(triethoxysilylpropyl)urethane, N-(3-methacryloxy-2-hydroxypropyl)-3-aminopropyl triethoxysilane, methacryloxy methyltriethoxysilane, methacryloxymethyl trimethoxysilane, methacryloxypropy methyldiethoxysilane, methacryloxypropyl methyldimethoxysilane, methacryl oxypropyltris(methoxyethoxy)silane, 3-(N-styrylmethyl-2-aminoethylamino) propyltrimethoxysilane hydrochloride,

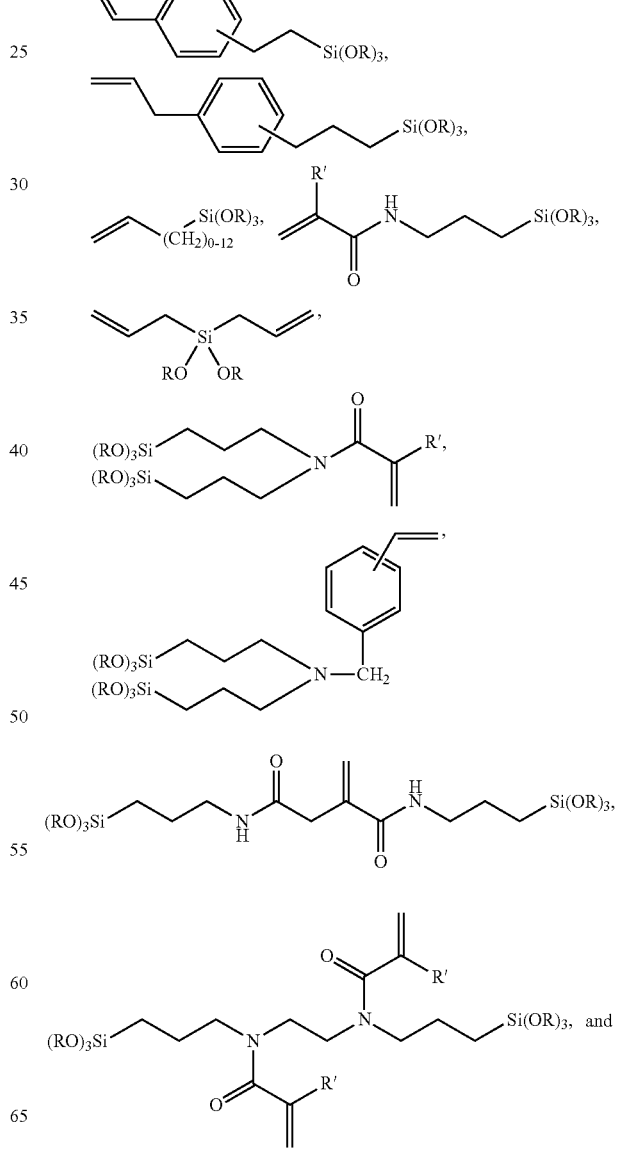

-continued

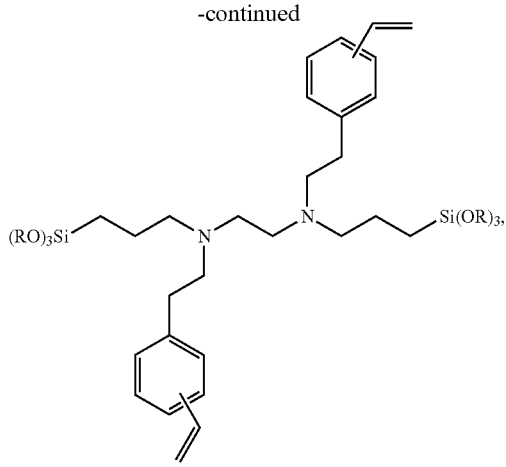

wherein
each R is independently H or a $C_1$-$C_{10}$ alkyl group and wherein R' is independently H or a $C_1$-$C_{10}$ alkyl group;

and the heterocyclic silane is selected from group consisting of

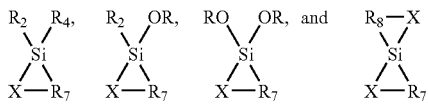

wherein
each R is independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, $C_6$-$C_{18}$ aralkyl, $C_6$-$C_{18}$ heteroaralkyl, —Si($R^c$)$_4$, —C(O)$R^c$, —C(S)$R^c$, —C(NR)$R^c$, —S(O)$R^c$, —S(O)$_2 R^c$, —P(O)$R^c R^c$, or —P(S)$R^c R^c$;

each $R^c$ is independently, H, $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, —O$C_1$-$C_{18}$ alkyl; —O$C_5$-$C_{18}$ aryl; —O$C_3$-$C_{18}$ heterocycloalkyl, —O$C_5$-$C_{18}$ heteroaryl, —NH$C_1$-$C_{18}$ alkyl; or —N($C_1$-$C_{18}$ alkyl)$_2$;

$R_2$ and $R_4$ are each independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, or $C_5$-$C_{18}$ heteroaryl;

each $R_7$ or $R_8$ is independently $C_1$-$C_{18}$ alkyl, $C_2$-$C_{18}$ alkenyl, $C_2$-$C_{18}$ alkenylene, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ arylene, $C_5$-$C_{18}$ heteroaryl, or $C_5$-$C_{18}$ heteroarylene, wherein each of $R_7$ and $R_8$ may be optionally substituted;

X is O, $NR_4$, or $S(O)_q$;

$R_A$ is $C_1$-$C_6$ alkyl, $C_3$-$C_{18}$ cycloalkyl, $C_3$-$C_{18}$ heterocycloalkyl, $C_5$-$C_{18}$ aryl, or $C_5$-$C_{18}$ heteroaryl; and q is 0-2.

In another embodiment, the invention provides a porous inorganic/organic homogenous copolymeric hybrid material, comprising heterocyclic silane monomers, wherein each heterocyclic silane monomer is independently selected from the group consisting of

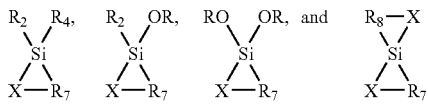

wherein
each R is independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, $C_6$-$C_{18}$ aralkyl, $C_6$-$C_{18}$ heteroaralkyl, —Si($R^c$)$_4$, —C(O)$R^c$, —C(S)$R^c$, —C(NR)$R^c$, —S(O)$R^c$, —S(O)$_2 R^c$, —P(O)$R^c R^c$, or —P(S)$R^c R^c$;

each $R^c$ is independently, H, $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, —O$C_1$-$C_{18}$ alkyl; —O$C_5$-$C_{18}$ aryl; —O$C_3$-$C_{18}$ heterocycloalkyl, —O$C_5$-$C_{18}$ heteroaryl, —NH$C_1$-$C_{18}$ alkyl; or —N($C_1$-$C_{18}$ alkyl)$_2$;

$R_2$ and $R_4$ are each independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, or $C_5$-$C_{18}$ heteroaryl;

each $R_7$ or $R_8$ is independently $C_1$-$C_{18}$ alkyl, $C_2$-$C_{18}$ alkenyl, $C_2$-$C_{18}$ alkenylene, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ arylene, $C_5$-$C_{18}$ heteroaryl, or $C_5$-$C_{18}$ heteroarylene, wherein each of $R_7$ and $R_8$ may be optionally substituted;

X is O, $NR_4$, or $S(O)_q$;

$R_A$ is $C_1$-$C_6$ alkyl, $C_3$-$C_{18}$ cycloalkyl, $C_3$-$C_{18}$ heterocycloalkyl, $C_5$-$C_{18}$ aryl, or $C_5$-$C_{18}$ heteroaryl; and q is 0-2.

In another embodiment, the invention provides a porous inorganic/organic homogenous copolymeric hybrid material, comprising an alkenyl-functionalized silane monomer and a heterocyclic silane monomer, wherein the alkenyl-functionalized silane monomer is selected from the group consisting of methacryloxypropyl trimethoxysilane, methacryloxypropyltriethoxysilane, vinyltriethoxysilane, vinyltrimethoxy silane, N-(3-acryloxy-2-hydroxypropyl)-3-aminopropyltriethoxysilane, (3-acryloxypropyl)trimethoxysilane, O-(methacryloxyethyl)-N-(triethoxysilylpropyl)urethane, N-(3-methacryl oxy-2-hydroxypropyl)-3-aminopropyltriethoxysilane, methacryloxymethyltriethoxysilane, methacryloxymethyltrimethoxysilane, methacryloxypropylmethyldiethoxysilane, methacryl oxypropylmethyldimethoxysilane, methacryloxypropyltris(methoxyethoxy)silane, 3-(N-styrylmethyl-2-aminoethylamino)propyltrimethoxysilane hydrochloride,

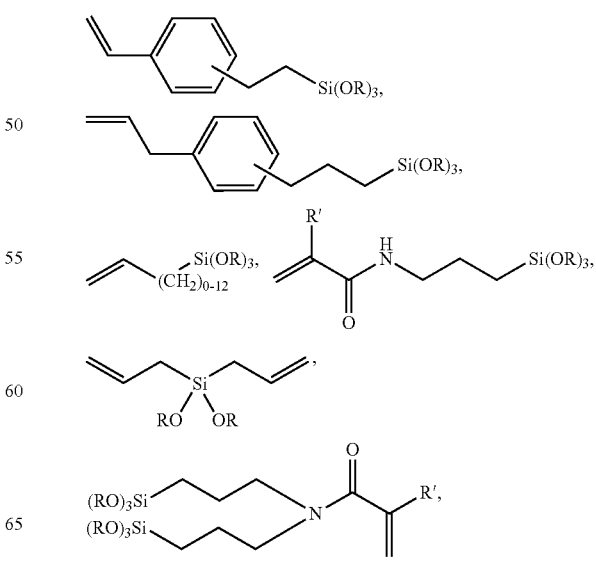

-continued

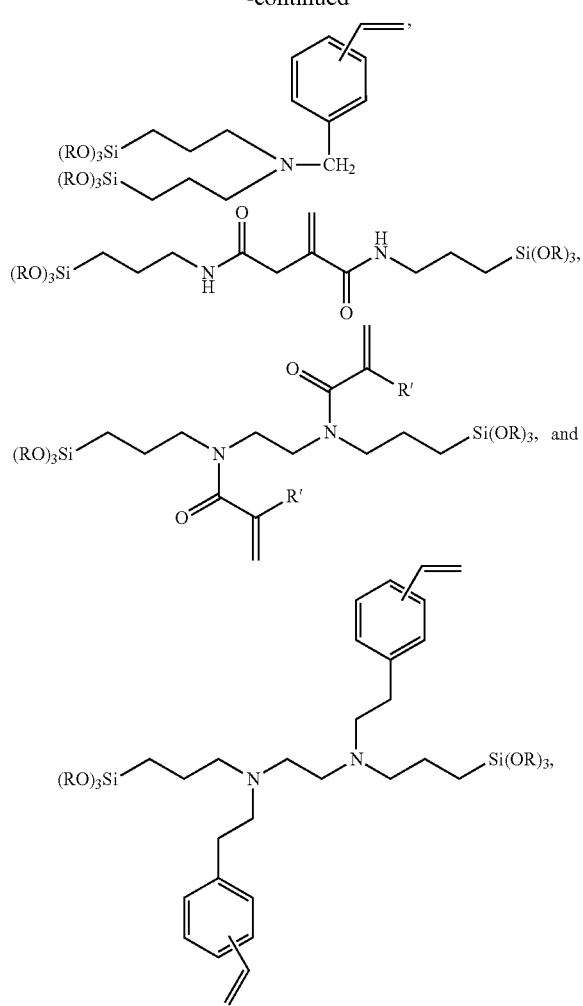

each R is independently H or a $C_1$-$C_{10}$ alkyl group and wherein R' is independently H or a $C_1$-$C_{10}$ alkyl group; and the heterocyclic silane is selected from group consisting of

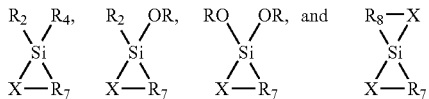

wherein each R is independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, $C_6$-$C_{18}$ aralkyl, $C_6$-$C_{18}$ heteroaralkyl, —Si(R$^c$)$_4$, —C(O)R$^c$, —C(S)R$^c$, —C(NR)R$^c$, —S(O)R$^c$, —S(O)$_2$R$^c$, —P(O)R$^c$R$^c$, or —P(S)R$^c$R$^c$;

each R$^c$ is independently, H, $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, —OC$_1$-$C_{18}$ alkyl; —OC$_5$-$C_{18}$ aryl; —OC$_3$-$C_{18}$ heterocycloalkyl, —OC$_5$-$C_{18}$ heteroaryl, —NHC$_1$-$C_{18}$ alkyl; or —N(C$_1$-$C_{18}$ alkyl)$_2$;

$R_2$ and $R_4$ are each independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, or $C_5$-$C_{18}$ heteroaryl;

each $R_7$ or $R_8$ is independently $C_1$-$C_{18}$ alkyl, $C_2$-$C_{18}$ alkenyl, $C_2$-$C_{18}$ alkenylene, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ arylene, $C_5$-$C_{18}$ heteroaryl, or $C_5$-$C_{18}$ heteroarylene, wherein each of $R_7$ and $R_8$ may be optionally substituted;

X is O, NR$_A$, or S(O)$_q$;

$R_A$ is $C_1$-$C_6$ alkyl, $C_3$-$C_{18}$ cycloalkyl, $C_3$-$C_{18}$ heterocycloalkyl, $C_5$-$C_{18}$ aryl, or $C_5$-$C_{18}$ heteroaryl; and q is 0-2.

In another embodiment, the invention provides a porous inorganic/organic homogenous copolymeric hybrid material, comprising an alkoxy silane monomer and a heterocyclic silane monomer, wherein the alkoxy silane monomer is selected from tetramethoxysilane, tetraethoxysilane, tetrapropoxysilane, and tetrabutoxysilane; and the heterocyclic silane is selected from group consisting of

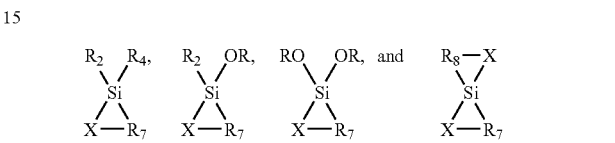

wherein each R is independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, $C_6$-$C_{18}$ aralkyl, $C_6$-$C_{18}$ heteroaralkyl, —Si(R$^c$)$_4$, —C(O)R$^c$, —C(S)R$^c$, —C(NR)R$^c$, —S(O)R$^c$, —S(O)$_2$R$^c$, —P(O)R$^c$R$^c$, or —P(S)R$^c$R$^c$;

each R$^c$ is independently, H, $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, —OC$_1$-$C_{18}$ alkyl; —OC$_5$-$C_{18}$ aryl; —OC$_3$-$C_{18}$ heterocycloalkyl, —OC$_5$-$C_{18}$ heteroaryl, —NHC$_1$-$C_{18}$ alkyl; or —N(C$_1$-$C_{18}$ alkyl)$_2$;

$R_2$ and $R_4$ are each independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, or $C_5$-$C_{18}$ heteroaryl;

each $R_7$ or $R_8$ is independently $C_1$-$C_{18}$ alkyl, $C_2$-$C_{18}$ alkenyl, $C_2$-$C_{18}$ alkenylene, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ arylene, $C_5$-$C_{18}$ heteroaryl, or $C_5$-$C_{18}$ heteroarylene, wherein each of $R_7$ and $R_8$ may be optionally substituted;

X is O, NR$_A$, or S(O)$_q$;

$R_A$ is $C_1$-$C_6$ alkyl, $C_3$-$C_{18}$ cycloalkyl, $C_3$-$C_{18}$ heterocycloalkyl, $C_5$-$C_{18}$ aryl, or $C_5$-$C_{18}$ heteroaryl; and q is 0-2.

In another embodiment, the invention provides a porous inorganic/organic homogenous copolymeric hybrid material, comprising heterocyclic silane monomers, wherein each heterocyclic silane monomer is independently selected from the group consisting of

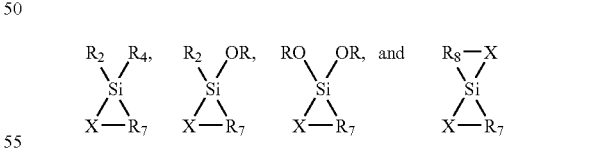

wherein each R is independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, $C_6$-$C_{18}$ aralkyl, $C_6$-$C_{18}$ heteroaralkyl, —Si(R$^c$)$_4$, —C(O)R$^c$, —C(S)R$^c$, —C(NR)R$^c$, —S(O)R$^c$, —S(O)$_2$R$^c$, —P(O)R$^c$R$^c$, or —P(S)R$^c$R$^c$;

each R$^c$ is independently, H, $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, —OC$_1$-$C_{18}$ alkyl; —OC$_5$-$C_{18}$ aryl; —OC$_3$-$C_{18}$ heterocycloalkyl, —OC$_5$-$C_{18}$ heteroaryl, —NHC$_1$-$C_{18}$ alkyl; or —N(C$_1$-$C_{18}$ alkyl)$_2$;

$R_2$ and $R_4$ are each independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, or $C_5$-$C_{18}$ heteroaryl;

each $R_7$ or $R_8$ is independently $C_1$-$C_{18}$ alkyl, $C_2$-$C_{18}$ alkenyl, $C_2$-$C_{18}$ alkenylene, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ arylene, $C_5$-$C_{18}$ heteroaryl, or $C_5$-$C_{18}$ heteroarylene, wherein each of $R_7$ and $R_8$ may be optionally substituted;

X is O, $NR_A$, or $S(O)_q$;

$R_A$ is $C_1$-$C_6$ alkyl, $C_3$-$C_{18}$ cycloalkyl, $C_3$-$C_{18}$ heterocycloalkyl, $C_5$-$C_{18}$ aryl, or $C_5$-$C_{18}$ heteroaryl; and q is 0-2.

In another embodiment, the invention provides a porous inorganic/organic homogenous copolymeric hybrid material, comprising an alkenyl-functionalized silane monomer and a heterocyclic silane monomer, wherein the alkenyl-functionalized silane monomer is selected from the group consisting of methacryloxypropyltrimethoxysilane, methacryloxypropyltriethoxysilane, vinyltriethoxysilane, vinyltrimethoxysilane, N-(3-acryloxy-2-hydroxypropyl)-3-aminopropyltriethoxysilane, (3-acryloxypropyl)trimethoxysilane, O-(methacryloxyethyl)-N-(triethoxysilylpropyl)urethane, N-(3-methacryloxy-2-hydroxypropyl)-3-aminopropyltriethoxysilane, methacryloxymethyl triethoxysilane, methacryloxymethyltrimethoxysilane, methacryloxypropyl methyldiethoxysilane, methacryloxypropylmethyldimethoxysilane, methacryloxypropyltris(methoxyethoxy)silane, 3-(N-styrylmethyl-2-aminoethylamino) propyltrimethoxysilane hydrochloride,

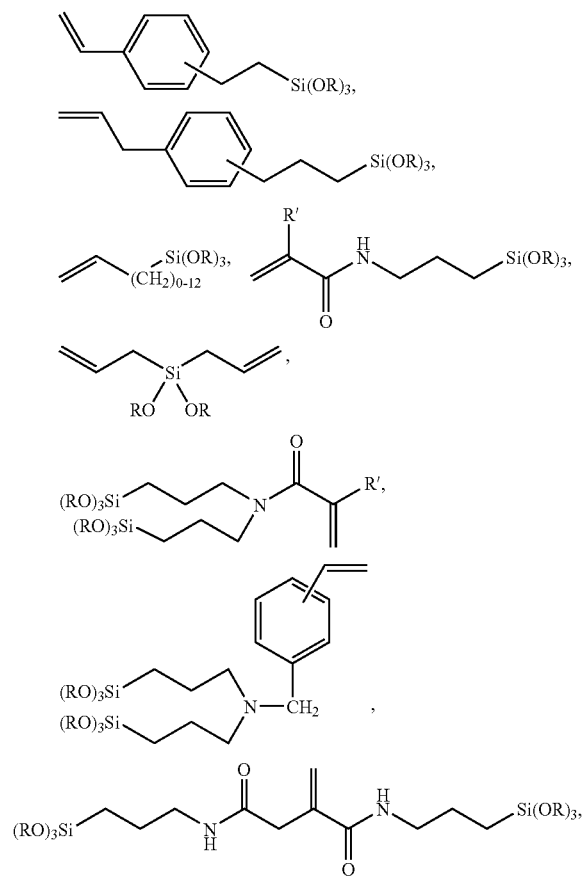

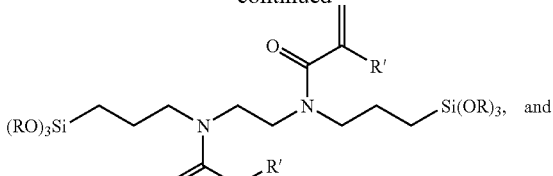

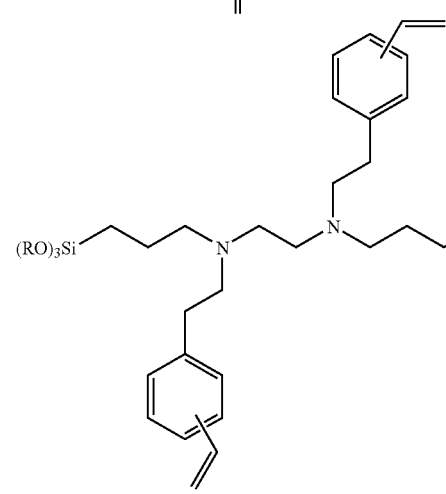

wherein each R is independently H or a $C_1$-$C_{10}$ alkyl group and wherein R' is independently H or a $C_1$-$C_{10}$ alkyl group; and the heterocyclic silane is selected from group consisting of

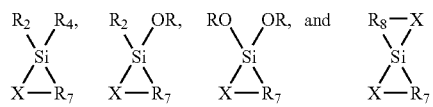

wherein each R is independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, $C_6$-$C_{18}$ aralkyl, $C_6$-$C_{18}$ heteroaralkyl, —Si(R$^c$)$_4$, —C(O)R$^c$, —C(S)R$^c$, —C(NR)R$^c$, —S(O)R$^c$, —S(O)$_2$R$^c$, —P(O)R$^c$R$^c$, or —P(S)R$^c$R$^c$;

each R$^c$ is independently, H, $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, —O$C_1$-$C_{18}$ alkyl; —O$C_5$-$C_{18}$ aryl; —O$C_3$-$C_{18}$ heterocycloalkyl, —O$C_5$-$C_{18}$ heteroaryl, —NH$C_1$-$C_{18}$ alkyl; or —N($C_1$-$C_{18}$ alkyl)$_2$;

$R_2$ and $R_4$ are each independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, or $C_5$-$C_{18}$ heteroaryl;

each $R_7$ or $R_8$ is independently $C_1$-$C_{18}$ alkyl, $C_2$-$C_{18}$ alkenyl, $C_2$-$C_{18}$ alkenylene, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ arylene, $C_5$-$C_{18}$ heteroaryl, or $C_5$-$C_{18}$ heteroarylene, wherein each of $R_7$ and $R_8$ may be optionally substituted;

X is O, $NR_A$, or $S(O)_q$;

$R_A$ is $C_1$-$C_6$ alkyl, $C_3$-$C_{18}$ cycloalkyl, $C_3$-$C_{18}$ heterocycloalkyl, $C_5$-$C_{18}$ aryl, or $C_5$-$C_{18}$ heteroaryl; and q is 0-2.

In another embodiment, the invention provides a porous inorganic/organic homogenous copolymeric hybrid material, comprising an alkoxy silane monomer and a heterocyclic silane monomer, wherein the alkoxy silane monomer is selected from tetramethoxysilane, tetraethoxysilane, tetrapropoxysilane, and tetrabutoxysilane; and the heterocyclic silane is selected from group consisting of

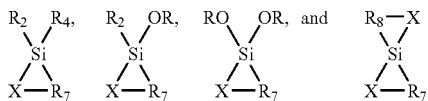

wherein each R is independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, $C_6$-$C_{18}$ aralkyl, $C_6$-$C_{18}$ heteroaralkyl, —Si($R^c$)$_4$, —C(O)$R^c$, —C(S)$R^c$, —C(NR)$R^c$, —S(O)$R^c$, —S(O)$_2R^c$, —P(O)$R^cR^c$, or —P(S)$R^cR^c$;

each $R^c$ is independently, H, $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, —O$C_1$-$C_{18}$ alkyl; —O$C_5$-$C_{18}$ aryl; —O$C_3$-$C_{18}$ heterocycloalkyl, —O$C_5$-$C_{18}$ heteroaryl, —NH$C_1$-$C_{18}$ alkyl; or —N($C_1$-$C_{18}$ alkyl)$_2$;

$R_2$ and $R_4$ are each independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, or $C_5$-$C_{18}$ heteroaryl;

each $R_7$ or $R_8$ is independently $C_1$-$C_{18}$ alkyl, $C_2$-$C_{18}$ alkenyl, $C_2$-$C_{18}$ alkenylene, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ arylene, $C_5$-$C_{18}$ heteroaryl, or $C_5$-$C_{18}$ heteroarylene, wherein each of $R_7$ and $R_8$ may be optionally substituted;

X is O, $NR_A$, or $S(O)_q$;

$R_A$ is $C_1$-$C_6$ alkyl, $C_3$-$C_{18}$ cycloalkyl, $C_3$-$C_{18}$ heterocloalkyl, $C_5$-$C_{18}$ aryl, or $C_5$-$C_{18}$ heteroaryl; and q is 0-2.

In still another embodiment, the invention provides a porous inorganic/organic homogenous copolymeric hybrid material, comprising heterocyclic silane monomers, wherein each heterocyclic silane monomer is independently selected from the group consisting of

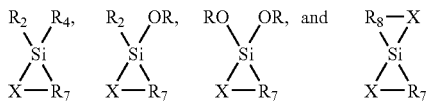

wherein each R is independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, $C_6$-$C_{18}$ aralkyl, $C_6$-$C_{18}$ heteroaralkyl, —Si($R^c$)$_4$, —C(O)$R^c$, —C(S)$R^c$, —C(NR)$R^c$, —S(O)$R^c$, —S(O)$_2R^c$, —P(O)$R^cR^c$, or —P(S)$R^cR^c$;

each $R^c$ is independently, H, $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, —O$C_1$-$C_{18}$ alkyl; —O$C_5$-$C_{18}$ aryl; —O$C_3$-$C_{18}$ heterocycloalkyl, —O$C_5$-$C_{18}$ heteroaryl, —NH$C_1$-$C_{18}$ alkyl; or —N($C_1$-$C_{18}$ alkyl)$_2$;

$R_2$ and $R_4$ are each independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocloalkyl, $C_5$-$C_{18}$ aryl, or $C_5$-$C_{18}$ heteroaryl;

each $R_7$ or $R_8$ is independently $C_1$-$C_{18}$ alkyl, $C_2$-$C_{18}$ alkenyl, $C_2$-$C_{18}$ alkenylene, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ arylene, $C_5$-$C_{18}$ heteroaryl, or $C_5$-$C_{18}$ heteroarylene, wherein each of $R_7$ and $R_8$ may be optionally substituted;

X is O, $NR_A$, or $S(O)_q$;

$R_A$ is $C_1$-$C_6$ alkyl, $C_3$-$C_{18}$ cycloalkyl, $C_3$-$C_{18}$ heterocloalkyl, $C_5$-$C_{18}$ aryl, or $C_5$-$C_{18}$ heteroaryl; and q is 0-2.

Properties of the Hybrid Material

In certain embodiments, the invention provides a porous inorganic/organic homogenous copolymeric hybrid material, wherein the material consists essentially of spherical particles. In a further embodiment, the particles are approximately spherical.

In a further embodiment, the particles have an average diameter of about 0.1 µm to about 300 µm. In a preferred embodiment, the particles have an average diameter of about 0.1 µm to about 60 µm. In another further embodiment, the particles have an average diameter of about 1 µm to about 5 µm.

In one embodiment, the invention provides a material, wherein the material has a specific surface area of about 50-800 $m^2$/g. In a further embodiment, the material has a specific surface area of about 100-700 $m^2$/g. In a preferred embodiment, the material has a specific surface area of about 100-300 $m^2$/g.

In certain embodiments, the material of the invention has specific pore volumes of about 0.2 to 2.5 $cm^3$/g. Preferred ranges of specific pores volumes include from about 0.4 to 1.5 $cm^3$/g.

Another embodiment of the invention includes a material of the invention wherein the material has an average pore diameter of about 20 to 600 Å. In certain instances, the material has an average pore diameter of about 50 to 300 Å. In preferred instances, the material has an average pore diameter of about 75 to 125 Å.

In one embodiment, the invention provides a material of the invention, wherein the material is hydrolytically stable at a pH of about 1 to about 14. In a further embodiment, the material is hydrolytically stable at a pH of about 10 to about 14. In a further embodiment, the material is hydrolytically stable at a pH of about 12 to about 14. In another further embodiment, the material is hydrolytically stable at a pH of about 1 to about 5. In a further embodiment, the material is hydrolytically stable at a pH of about 1 to about 3.

Uses

The porous inorganic/organic homogenous copolymeric hybrid materials of the invention may be used as a liquid chromatography stationary phase; a sequestering reagent; a solid support for combinatorial chemistry; a solid support for oligosaccharide, polypeptide, or oligonucleotide synthesis; a solid support for a biological assay; a capillary biological assay device for mass spectrometry; a template for a controlled large pore polymer film; a capillary chromatography stationary phase; an electrokinetic pump packing material; a polymer additive; a catalyst; or a packing material for a microchip separation device. In certain instances, the material comprises a HPLC stationary phase. The materials of the invention are particularly suitable for use as a HPLC stationary phase or, in general, as a stationary phase in a separations device, such as chromatographic columns, thin layer plates, filtration membranes, sample cleanup devices, and microtiter plates.

In one embodiment, the materials of the invention are used in a separations device, wherein the device is selected from chromatographic columns, thin layer plates, filtration membranes, sample cleanup devices, and microtiter plates. The materials and particles of the invention have a wide variety of end uses in the separation sciences, such as packing materials for chromatographic columns (wherein such columns may have improved stability to alkaline mobile phases and reduced peak tailing for basic analytes), thin layer chromatographic (TLC) plates, filtration membranes, microtiter plates, scavenger resins, solid phase organic synthesis supports (e.g., in automated peptide or oligonucleotide synthesizers), and the like having a stationary phase which includes porous inorganic/organic homogenous copolymeric hybrid particles. The stationary phase may be introduced by packing, coating, impregnation, etc., depending on the requirements of the particular device. In a particularly advantageous embodiment, the chromatographic device is a packed chromatographic column, such as commonly used in HPLC.

Preparation of Materials of the Invention

In one aspect, the invention provides a porous inorganic/organic homogenous copolymeric hybrid material comprising two or more repeat units, wherein at least one repeat unit is an organosilane repeat unit D (previously described), prepared by the steps of (a) partially condensing an organic olefin, an alkenyl functionalized silane, an alkoxysilane, or a heterocyclic silane, or mixtures thereof, (b) adding a heterocyclic silane, and (c) further reacting the heterocyclic silane with the partially condensed polymer of step (a) to thereby prepare a porous inorganic/organic homogenous copolymeric hybrid material comprising a carbon-heteroatom-silicon functionality.

In another aspect, the invention provides a porous inorganic/organic homogenous copolymeric hybrid material comprising two or more repeat units, wherein at least one repeat unit is an organosilane repeat unit D (previously described), prepared by the steps of (a) preparing a polyoligomeric siloxane (POS) by partial condensation of tetraalkoxylsilane C, (b) adding a heterocyclic silane, and (c) further reacting the heterocyclic silane with the POS to thereby prepare a porous inorganic/organic homogenous copolymeric hybrid material comprising a carbon-heteroatom-silicon functionality; wherein the heterocyclic silane is selected from the group consisting of

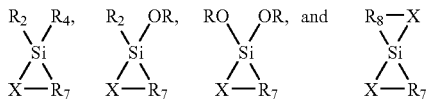

wherein
each R is independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, $C_6$-$C_{18}$ aralkyl, $C_6$-$C_{18}$ heteroaralkyl, —Si($R^c$)$_4$, —C(O)$R^c$, —C(S)$R^c$, —C(NR)$R^c$, —S(O)$R^c$, —S(O)$_2R^c$, —P(O)$R^cR^c$, or —P(S)$R^cR^c$;

each $R^c$ is independently, H, $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, —OC$_1$-$C_{18}$ alkyl; —OC$_5$-$C_{18}$ aryl; —OC$_3$-$C_{18}$ heterocycloalkyl, —OC$_5$-$C_{18}$ heteroaryl, —NHC$_1$-$C_{18}$ alkyl; or —N(C$_1$-$C_{18}$ alkyl)$_2$;

$R_2$ and $R_4$ are each independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, or $C_5$-$C_{18}$ heteroaryl;

each $R_7$ or $R_8$ is independently $C_1$-$C_{18}$ alkyl, $C_2$-$C_{18}$ alkenyl, $C_2$-$C_{18}$ alkenylene, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ arylene, $C_5$-$C_{18}$ heteroaryl, or $C_5$-$C_{18}$ heteroarylene, wherein each of $R_7$ and $R_8$ may be optionally substituted;

X is O, $NR_A$, or S(O)$_q$;

$R_A$ is $C_1$-$C_6$ alkyl, $C_3$-$C_{18}$ cycloalkyl, $C_3$-$C_{18}$ heterocycloalkyl, $C_5$-$C_{18}$ aryl, or $C_5$-$C_{18}$ heteroaryl; and q is 0-2.

In one aspect, the invention provides a method of preparing a porous inorganic/organic homogenous copolymeric hybrid material comprising two or more repeat units, wherein at least one repeat unit is an organosilane repeat unit D (previously described), prepared by the steps of (a) partially condensing an organic olefin, an alkenyl functionalized silane, an alkoxysilane, or a heterocyclic silane, or mixtures thereof, (b) adding a heterocyclic silane, and (c) further reacting the heterocyclic silane with the partially condensed polymer of step (a) to thereby prepare a porous inorganic/organic homogenous copolymeric hybrid material comprising a carbon-heteroatom-silicon functionality.

In another aspect, the invention provides a method of preparing a porous inorganic/organic homogenous copolymeric hybrid material comprising two or more repeat units, wherein at least one repeat unit is an organosilane repeat unit D (previously described), prepared by the steps of (a) preparing a polyoligomeric silaxane (POS) by partial condensation of tetraalkoxylsilane, (b) adding a heterocyclic silane, and (c) further reacting the heterocyclic silane with the POS to thereby prepare a porous inorganic/organic homogenous copolymeric hybrid material, comprising a carbon-heteroatom-silicon functionality.

In still another aspect, the invention provides a method of preparing a porous inorganic/organic homogenous copolymeric hybrid material comprising two or more repeat units, wherein at least one repeat unit is an organosilane repeat unit D (previously described), prepared by the steps of (a) preparing a polyoligomeric silaxane (POS) by partial condensation of tetraalkoxylsilane, (b) adding a heterocyclic silane, and (c) further reacting the heterocyclic silane with the POS to thereby prepare a porous inorganic/organic homogenous copolymeric hybrid material, comprising a carbon-heteroatom-silicon functionality; wherein the heterocyclic silane is selected from the group consisting of

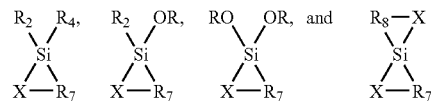

wherein
each R is independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, $C_6$-$C_{18}$ aralkyl, $C_6$-$C_{18}$ heteroaralkyl, —Si($R^c$)$_4$, —C(O)$R^c$, —C(S)$R^c$, —C(NR)$R^c$, —S(O)$R^c$, —S(O)$_2R^c$, —P(O)$R^cR^c$, or —P(S)$R^cR^c$;

each $R^c$ is independently, H, $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, —OC$_1$-$C_{18}$ alkyl; —OC$_5$-$C_{18}$ aryl; —OC$_3$-$C_{18}$ heterocycloalkyl, —OC$_5$-$C_{18}$ heteroaryl, —NHC$_1$-$C_{18}$ alkyl; or —N(C$_1$-$C_{18}$ alkyl)$_2$;

$R_2$ and $R_4$ are each independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, or $C_5$-$C_{18}$ heteroaryl;

each $R_7$ or $R_8$ is independently $C_1$-$C_{18}$ alkyl, $C_2$-$C_{18}$ alkenyl, $C_2$-$C_{18}$ alkenylene, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ arylene, $C_5$-$C_{18}$ heteroaryl, or $C_5$-$C_{18}$ heteroarylene, wherein each of $R_7$ and $R_8$ may be optionally substituted;

X is O, $NR_A$, or S(O)$_q$;

$R_A$ is $C_1$-$C_6$ alkyl, $C_3$-$C_{18}$ cycloalkyl, $C_3$-$C_{18}$ heterocycloalkyl, $C_5$-$C_{18}$ aryl, or $C_5$-$C_{18}$ heteroaryl; and q is 0-2.

In yet another aspect, the invention provides a method of preparing a porous inorganic/organic homogenous copolymeric hybrid material of formula I:

$$(A)_w(B)_x(C)_y(D)_z;$$ (Formula I)

wherein the order of repeat units A, B, C, and D may be random, block, or a combination of random and block; and wherein A is an organic repeat unit which is covalently bonded to one or more repeat units A, B, or D via an organic bond;

B is an organosiloxane repeat unit which is bonded to: one or more repeat units A, B, or D via an organic bond; one or more repeat units B, C, or D via an inorganic bond; or one or more repeat unit D via a carbon-heteroatom-silicon bond;

C is an inorganic repeat unit which is bonded to: one or more repeat units B, C, or D via an inorganic bond; or one or more repeat unit D via a carbon-heteroatom-silicon bond;

D is an organosilane repeat unit which is bonded to one or more repeat units A, B, or D via an organic bond; bonded to one or more repeat units B, C, or D via an inorganic bond; or one or more repeat units B, C, or D via a carbon-heteroatom-silicon bond;

w, x, and y are positive numbers or zero; wherein w+x+y>0, z is a positive number;

the method comprising the steps of (a) partially condensing an organic olefin, an alkenyl functionalized silane, an alkoxysilane, or a heterocyclic silane, or mixtures thereof, (b) adding a heterocyclic silane, and (c) further reacting the heterocyclic silane with the partially condensed polymer of step (a) to thereby prepare a porous inorganic/organic homogenous copolymeric hybrid material comprising a carbon-heteroatom-silicon functionality.

In another aspect, the invention provides a method of preparing a porous inorganic/organic homogenous copolymeric hybrid material of formula II:

$$(C)_y(D)_z;$$ (Formula II)

wherein the order of repeat units C and D may be random, block, or a combination of random and block; and wherein C is an inorganic repeat unit which is bonded to: one or more repeat units C or D via an inorganic bond; or one or more repeat units D via a carbon-heteroatom-silicon bond;

D is an organosilane repeat unit which is bonded to: one or more repeat units C or D via an inorganic bond; one or more repeat units C or D via a carbon-heteroatom-silicon bond; or one or more repeat units D via an organic bond, and y and z are positive numbers;

the method comprising the steps of (a) preparing a polyoligomeric silaxane (POS) by partial condensation of a tetraalkoxylsilane, (b) adding a heterocyclic silane, and (c) further reacting the heterocyclic silane with the POS to thereby prepare a porous inorganic/organic homogenous copolymeric hybrid material, comprising a carbon-heteroatom-silicon functionality.

In one embodiment, the invention provides a method of synthesis wherein the heterocyclic silane is selected from the group consisting of

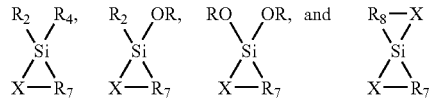

wherein each R is independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, $C_6$-$C_{18}$ aralkyl, $C_6$-$C_{18}$ heteroaralkyl, —Si(R$^c$)$_4$, —C(O)R$^c$, —C(S) R$^c$, —C(NR) R$^c$, —S(O) R$^c$, —S(O)$_2$R$^c$, —P(O) R$^c$R$^c$, or —P(S) R$^c$R$^c$;

each R$^c$ is independently, H, $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, —O$C_1$-$C_{18}$ alkyl; —O$C_5$-$C_{18}$ aryl; —O$C_3$-$C_{18}$ heterocycloalkyl, —O$C_5$-$C_{18}$ heteroaryl, —NH$C_1$-$C_{18}$ alkyl; or —N($C_1$-$C_{18}$ alkyl)$_2$;

$R_2$ and $R_4$ are each independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, or $C_5$-$C_{18}$ heteroaryl;

each $R_7$ or $R_8$ is independently $C_1$-$C_{18}$ alkyl, $C_2$-$C_{18}$ alkenyl, $C_2$-$C_{18}$ alkenylene, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ arylene, $C_5$-$C_{18}$ heteroaryl, or $C_5$-$C_{18}$ heteroarylene, wherein each of $R_7$ and $R_8$ may be optionally substituted;

X is O, NR$_A$, or S(O)$_q$;

$R_A$ is $C_1$-$C_6$ alkyl, $C_3$-$C_{18}$ cycloalkyl, $C_3$-$C_{18}$ heterocycloalkyl, $C_5$-$C_{18}$ aryl, or $C_5$-$C_{18}$ heteroaryl; and q is 0-2.

In another embodiment, the method steps (b) and (c) are performed contemporaneously.

In still another embodiment, the hydrolytically condensing step is acid- or base-catalyzed. In a further embodiment, the condensation step is acid-catalyzed. In one embodiment, the acid is selected from the group consisting of hydrochloric acid, hydrobromic acid, hydrofluoric acid, hydroiodic acid, sulfuric acid, formic acid, acetic acid, trichloroacetic acid, trifluoroacetic acid, and phosphoric acid. In another further embodiment, the condensation step is base-catalyzed. In another embodiment, the base is selected from the group consisting of ammonium hydroxide, hydroxide salts of the group I and group II metals, carbonate and hydrogen carbonate salts of the group I metals, and alkoxide salts of the group I and group II metals.

In certain embodiments, method steps (a), (b), and (c) are performed in the same reaction vessel.

In another embodiment, method steps (a) and (b) are performed in a solvent selected from the group consisting of water, methanol, ethanol, propanol, isopropanol, butanol, tert-butanol, pentanol, hexanol, cyclohexanol, hexafluoroisopropanol, cyclohexane, petroleum ethers, diethyl ether, dialkyl ethers, tetrahydrofuran, acetonitrile, ethyl acetate, pentane, hexane, heptane, benzene, toluene, xylene, N,N-dimethylformamide, dimethyl sulfoxide, 1-methyl-2-pyrrolidinone, methylene chloride, chloroform, and combinations thereof.

In certain instances, the method step (a) or step (b) further comprises the step of addition of a porogen. In one embodiment, the porogen is selected from the group consisting of cyclohexanol, toluene, 2-ethylhexanoic acid, dibutylphthalate, 1-methyl-2-pyrrolidinone, 1-dodecanol, and Triton X-45.

In other instances, the method further comprises the step of adding a free radical polymerization initiator. In one embodiment, the free radical polymerization initiator is selected from the group consisting of 2,2'-azobis-[2-(imidazolin-2-yl)propane]dihydrochloride, 2,2'-azobisisobutyronitrile, 4,4'-azobis(4-cyanovaleric acid), 1,1'-azobis(cyclohexanecarbonitrile), 2,2'-azobis(2-propionamidine)dihydrochloride, 2,2' azobis(2,4-dimethylpentanenitrile), 2,2'-azobis(2-methylbutanenitrile), benzoyl peroxide, 2,2-bis(tert-butylperoxy)butane, 1,1-bis(tert-butylperoxy)cyclohexane, 2,5-bis(tert-butylperoxy)butane, -2,5-dimethylhexane, 2,5-bis(tert-butylperoxy)-2,5-dimethyl-hexyne, bis(1-(tert-butylperoxy)-1-methyethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene peroxide, cyclohexanone hydroperoxide, dicumyl peroxide, lauroyl peroxide, 2,4-pentanedione peroxide, peracetic acid, and potassium persulfate.

In other instances the method further comprises the step of heating following the addition of the free radical polymerization initiator.

In another embodiment, the method steps further comprise the step of addition of a surface modifier. In one embodiment, the surface modifier is selected from the group consisting of octyltrichlorosilane, octadecyltrichlorosilane, octyldimethylchlorosilane, and octadecyl dimethylchlorosilane. In a further embodiment, the surface modifier is selected from octyltrichlorosilane and octadecyltrichlorosilane. Additionally, the methods of the invention may also include a step of modifying surfaces of the hybrid particles by formation of an organic covalent bond between an organic group of the particle and a surface modifier. In this regard, the method may include a further step of by adding a surface modifier selected from the group consisting of an organic group surface modifier, a silanol group surface modifier, a polymeric coating surface modifier, and combinations thereof. Likewise, the surface modifier may be a polymer coating, such as Sylgard®.

In one embodiment of the invention, the surface organic groups of the hybrid silica are derivatized or modified in a subsequent step via formation of an organic covalent bond between the particle's organic group and the modifying reagent. Alternatively, the surface silanol groups of the hybrid silica are derivatized into siloxane organic groups, such as by reacting with an organotrihalosilane, e.g., octadecyltrichlorosilane, or a halopolyorganosilane, e.g., octadecyldimethylchlorosilane. Alternatively, the surface organic and silanol groups of the hybrid silica are both derivatized. The surface of the thus-prepared material is then covered by the organic groups, e.g., alkyl, embedded during the gelation and the organic groups added during the derivatization process or processes.

In yet another embodiment, the invention provides a method wherein said particles have been surface modified by a combination of organic group and silanol group modification. In another embodiment, the particles have been surface modified by a combination of organic group modification and coating with a polymer. In still another embodiment, the particles have been surface modified by a combination of silanol group modification and coating with a polymer. In other embodiments, the particles have been surface modified via formation of an organic covalent bond between the particle's organic group and the modifying reagent. In another embodiment, the particles have been surface modified by a combination of organic group modification, silanol group modification, and coating with a polymer.

The method of the invention may also include a step of endcapping free silanol groups according to methods which are readily known in the art.

In still another embodiment, the invention provides a method further comprising the step of adding a surfactant or stabilizer. In a further embodiment, the surfactant is Triton X-45, Triton X100, Triton X305, TLS, Pluronic F-87, Pluronic P-105, Pluronic P-123, sodium dodecylsulfate (SDS), or Triton X-405.

In one embodiment, the pore structure of the as-prepared hybrid material is modified by hydrothermal treatment, which enlarges the openings of the pores as well as the pore diameters, as confirmed by nitrogen ($N_2$) sorption analysis. The hydrothermal treatment is performed by preparing a slurry containing the as-prepared hybrid material and a solution of organic base in water, heating the slurry in an autoclave at an elevated temperature, e.g., about 143 to 168° C., for a period of about 6 to 28 h. The pH of the slurry can be adjusted to be in the range of about 8.0 to 12.7 using tetraethylammonium hydroxide (TEAH) or TRIS and concentrated acetic acid. The concentration of the slurry is in the range of about 1 g hybrid material per 5 to 10 mL of the base solution.

The thus-treated hybrid material is filtered, and washed with water until the pH of the filtrate reaches about 7, washed with acetone or methanol, then dried at about 100° C. under reduced pressure for about 16 h. The resultant hybrid materials show average pore diameters in the range of about 100-300 Å. The surface of the hydrothermally treated hybrid material may be modified in a similar fashion to that of the hybrid material that is not modified by hydrothermal treatment as described in the present invention.

Moreover, the surface of the hydrothermally treated hybrid silica contains organic groups, which can be derivatized by reacting with a reagent that is reactive towards the hybrid materials' organic group. For example, vinyl groups on the material can be reacted with a variety of olefin reactive reagents such as bromine ($Br_2$), hydrogen ($H_2$), free radicals, propagating polymer radical centers, dienes, and the like. In another example, hydroxyl groups on the material can be reacted with a variety of alcohol reactive reagents such as isocyanates, carboxylic acids, carboxylic acid chlorides, and reactive organosilanes as described below. Reactions of this type are well known in the literature, see, e.g., March, J. "Advanced Organic Chemistry," $3^{rd}$ Edition, Wiley, New York, 1985; Odian, G. "The Principles of Polymerization," $2^{nd}$ Edition, Wiley, New York, 1981.

In addition, the surface of the hydrothermally treated hybrid silica also contains silanol groups, which can be derivatized by reacting with a reactive organosilane. The surface derivatization of the hybrid silica is conducted according to standard methods, for example by reaction with octadecyltrichlorosilane or octadecyldimethylchlorosilane in an organic solvent under reflux conditions. An organic solvent such as toluene is typically used for this reaction. An organic base such as pyridine or imidazole is added to the reaction mixture to catalyze the reaction. The product of this reaction is then washed with water, toluene and acetone and dried at about 80° C. to 100° C. under reduced pressure for about 16 h. The resultant hybrid silica can be further reacted with a short-chain silane such as trimethylchlorosilane to endcap the remaining silanol groups, by using a similar procedure described above.

The surface of the hybrid silica materials may also be surface modified by coating with a polymer. Polymer coatings are known in the literature and may be provided generally by polymerization or polycondensation of physisorbed monomers onto the surface without chemical bonding of the polymer layer to the support (type I), polymerization or polycondensation of physisorbed monomers onto the surface with chemical bonding of the polymer layer to the support (type II), immobilization of physisorbed prepolymers to the support (type III), and chemisorption of presynthesized polymers onto the surface of the support (type IV). See, e.g., Hanson et al., *J. Chromat. A* 656 (1993) 369-380. As noted above, coating the hybrid material with a polymer may be used in conjunction with various surface modifications described in the invention. In a preferred embodiment, Sylgard® (Dow Corning, Midland, Mich., USA) is used as the polymer.

A stabilizer describes reagents which inhibit the coalescence of droplets of organic monomer and POS or PAS polymers in an aqueous continuous phase. These can include but are not limited to finely divided insoluble organic or inorganic materials, electrolytes, and water-soluble polymers. Typical stabilizers are methyl celluloses, gelatins, polyvinyl alcohols, salts of poly(methacrylic acid), and surfactants. Surfactants (also referred to as emulsifiers or soaps) are molecules which have segments of opposite polarity and solubilizing tendency, e.g., both hydrophilic and hydrophobic segments.

Because of their hybrid nature, the materials of the invention are stable over a broad pH range.

An advantageous feature of the materials of the invention is their reduced swelling upon solvation with organic solvents than conventional organic LC resins. Therefore, in one embodiment, the material swells by less than about 25% (or 15% or 10% or even 5%) by volume upon solvation with an organic solvent, such as acetonitrile, methanol, ethers (such as diethyl ether), tetrahydrofuran, dichloromethane, chloroform, hexane, heptane, cyclohexane, ethyl acetate, benzene, or toluene.

The materials of the invention may be surface modified by formation of an organic covalent chemical bond between an inorganic or organic group of the material and a surface modifier. The surface modifier may be an organic group surface modifier, a silanol group surface modifier, a polymeric coating surface modifier, or combinations thereof. Likewise, the surface modifier may be octyltrichlorosilane, octadecyltrichlorosilane, octyldimethyl chlorosilane, or octadecyldimethylchlorosilane.

Additionally, the surface modifier is a combination of an organic group surface modifier and a silanol group surface modifier; a combination of an organic group surface modifier and a polymeric coating surface modifier; a combination of a silanol group surface modifier and a polymeric coating surface modifier; or a combination of an organic group surface modifier, a silanol group surface modifier, and a polymeric coating surface modifier. The surface modifier may also be a silanol group surface modifier.

The inorganic portion of the hybrid monolith materials of the invention may be alumina, silica, titanium oxide, zirconium oxide, or ceramic materials.

In one embodiment, the invention provides a method of preparing the material of formula I, wherein the organic olefin monomer of A is selected from the group consisting of divinylbenzene, styrene, ethylene glycol dimethacrylate, 1-vinyl-2-pyrrolidinone and tert-butylmethacrylate, acrylamide, methacrylamide, N,N'-(1,2-dihydroxyethylene)bisacrylamide, N,N'-ethylenebisacrylamide, N,N'-methylenebisacrylamide, butyl acrylate, ethyl acrylate, methyl acrylate, 2-(acryloxy)-2-hydroxypropyl methacrylate, 3-(acryloxy)-2-hydroxypropyl methacrylate, trimethylolpropane triacrylate, trimethylolpropane ethoxylate triacrylate, tris[(2-acryloyloxy)ethyl]isocyanurate, acrylonitrile, methacrylonitrile, itaconic acid, methacrylic acid, trimethylsilylmethacrylate, N-[tris(hydroxymethyl)methyl]acrylamide, (3-acrylamidopropyl)trimethylammonium chloride, [3-(methacryloylamino)propyl]dimethyl(3-sulfopropyl)ammonium hydroxide inner salt,

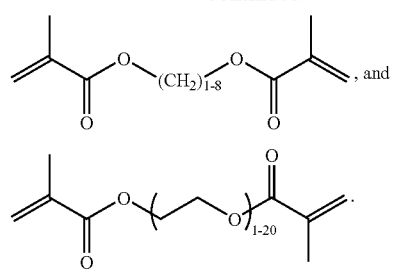

In another embodiment, the invention provides a method of preparing the material of formula I, wherein the alkenyl-functionalized organosiloxane monomer of B is selected from the group consisting of methacryloxypropyltrimethoxysilane, methacryloxypropyl triethoxysilane, vinyltriethoxysilane, vinyltrimethoxysilane, N-(3-acryloxy-2-hydroxypropyl)-3-aminopropyltriethoxysilane, (3-acryloxypropyl)trimethoxysilane, O-(methacryloxyethyl)-N-(triethoxysilylpropyl)urethane, N-(3-methacryloxy-2-hydroxypropyl)-3-aminopropyltriethoxysilane, methacryloxymethyltriethoxysilane, methacryloxy methyltrimethoxysilane, methacryloxypropylmethyldiethoxysilane, methacryloxypropyl methyldimethoxysilane, methacryloxypropyltris(methoxyethoxy)silane, 3-(N-styrylmethyl-2-aminoethylamino)propyltrimethoxysilane hydrochloride,

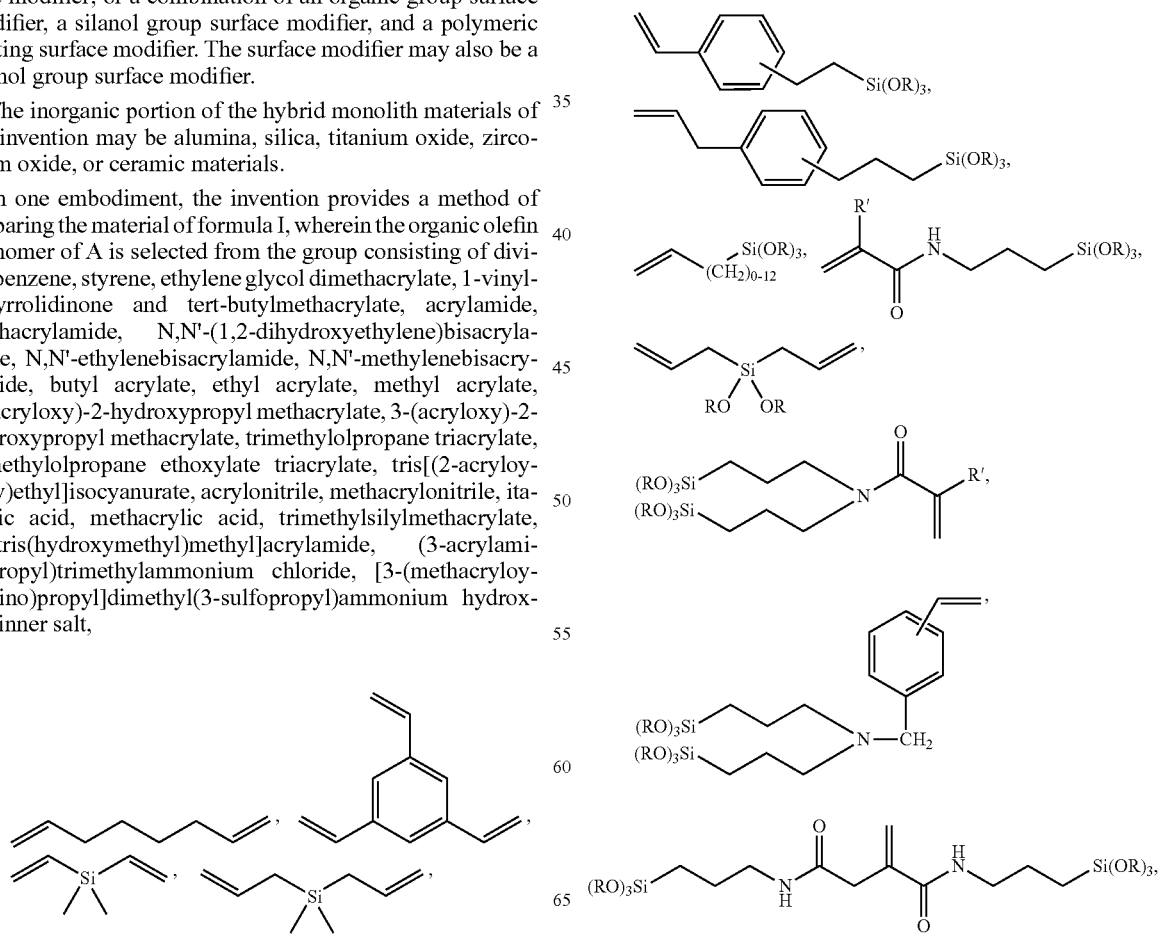

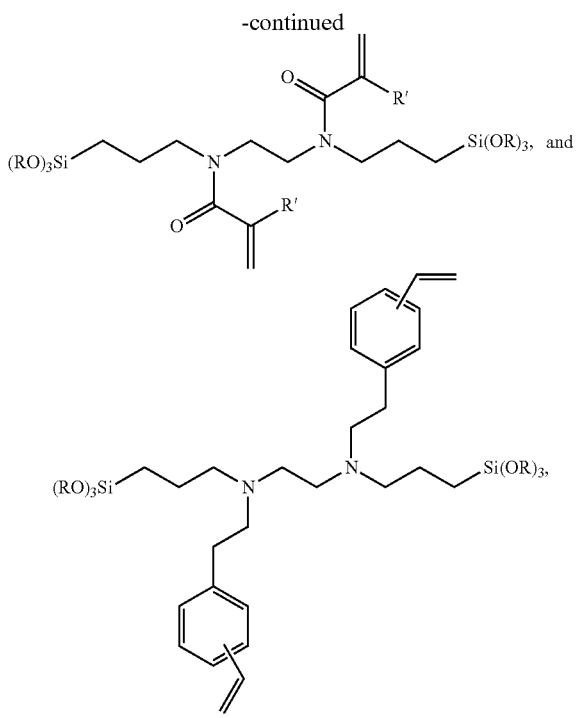

wherein
each R is independently H or a $C_1$-$C_{10}$ alkyl group and wherein R' is independently H or a $C_1$-$C_{10}$ alkyl group. In a further embodiment, each R is independently hydrogen, methyl, ethyl, or propyl. In another further embodiment, all of the R groups are identical and are selected from the group consisting of hydrogen, methyl, ethyl, or propyl.

In one embodiment, the invention provides a method of preparing a material of formula I or formula II, wherein the alkoxysilane monomer of C is selected from the group consisting of tetramethoxysilane, tetraethoxysilane, tetrapropoxysilane, and tetrabutoxysilane.

In certain instances, the tetraalkoxysilane is tetramethoxysilane or tetraethoxysilane.

In still another embodiment, the invention provides a method of preparing a material of formula I or formula II, wherein the heterocyclic silane monomer of D is selected from the group consisting of

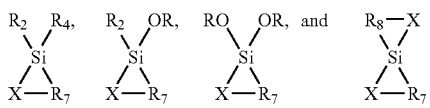

wherein
each R is independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, $C_6$-$C_{18}$ aralkyl, $C_6$-$C_{18}$ heteroaralkyl, —Si(R$^c$)$_4$, —C(O)R$^c$, —C(S)R$^c$, —C(NR)R$^c$, —S(O)R$^c$, —S(O)$_2$R$^c$, —P(O)R$^c$R$^c$, or —P(S)R$^c$R$^c$;

each R$^c$ is independently, H, $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, —O$C_1$-$C_{18}$ alkyl; —O$C_5$-$C_{18}$ aryl; —O$C_3$-$C_{18}$ heterocycloalkyl, —O$C_5$-$C_{18}$ heteroaryl, —NH$C_1$-$C_{18}$ alkyl; or —N($C_1$-$C_{18}$ alkyl)$_2$;

$R_2$ and $R_4$ are each independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, or $C_5$-$C_{18}$ heteroaryl;

each $R_7$ or $R_8$ is independently $C_1$-$C_{18}$ alkyl, $C_2$-$C_{18}$ alkenyl, $C_2$-$C_{18}$ alkenylene, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ arylene, $C_5$-$C_{18}$ heteroaryl, or $C_5$-$C_{18}$ heteroarylene, wherein each of $R_7$ and $R_8$ may be optionally substituted;

X is O, NR$_A$, or S(O)$_q$;

R$_A$ is $C_1$-$C_6$ alkyl, $C_3$-$C_{18}$ cycloalkyl, $C_3$-$C_{18}$ heterocycloalkyl, $C_5$-$C_{18}$ aryl, or $C_5$-$C_{18}$ heteroaryl; and q is 0-2.

The methods of the invention may also include a step of chemically modifying the organic olefin or alkenyl-functionalized organisiloxane prior to copolymerization.

EXAMPLES

The present invention may be further illustrated by the following non-limiting examples describing the preparation of porous inorganic/organic hybrid materials, and their use.

Example 1

1,1-Dimethyl-1-Sila-2-Oxacyclohexane (DMSOH, Gelest Inc., Tullytown, N.J.), N-n-Butyl-AZA-2,2-dimethoxysilacyclopentane (BADMSP, Gelest Inc., Tullytown, N.J.), or N-Methyl-AZA-2,2,4-trimethylsilacyclopentane (MAT-MSP, Gelest Inc., Tullytown, N.J.) was added to a polyethoxylated siloxane polymer (POS, as described in K. Unger, et. al. *Colloid & Polymer Science* vol. 253 pp. 658-664 (1975)) in a flask. The resulting mixture was agitated at 25-120° C. for 0.08-24 hours under a nitrogen atmosphere. The resulting polyorganoalkoxysiloxanes were colorless to colored viscous liquids. The chemical formulas are listed in Table 1 for the organotrialkoxysilanes and alkoxysilanes used to make the product polyorganoalkoxysiloxanes (POS). Specific amounts are listed in Table 2 for the starting materials used to prepare these products. Viscosity was determined for these materials using a Brookfield digital viscometer Model DV-II (Middleboro, Mass.).

TABLE 1

| Product | Organoalkoxysilanes | Organoalkoxysilanes Chemical Structure | POS Chemical Formula |
|---|---|---|---|
| 1a, b, c, d, e | 1,1-Dimethyl-1-Sila-2-Oxacyclohexane (DMSOH) | 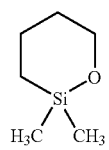 | Si(OH)$_x$(OCH$_2$CH$_3$)$_y$(O—)$_z$ |

TABLE 1-continued

| Product | Organoalkoxysilanes | Organoalkoxysilanes Chemical Structure | POS Chemical Formula |
|---|---|---|---|
| 1f, g | N-n-Butyl-AZA-2,2-dimethoxysilacyclo-Pentane (BADMSP) | (structure with Si(OCH₃)₂, N-CH₂CH₂CH₂CH₃ in cyclopentane ring) | $Si(OH)_x(OCH_2CH_3)_y(O-)_z$ |
| 1h, i, j | N-Methyl-AZA-2,2,4-trimethylsilacyclopentane (MATMSP) | (structure with Si(CH₃)₂, N-CH₃, 4-CH₃ in cyclopentane ring) | $Si(OH)_x(OCH_2CH_3)_y(O-)_z$ |

TABLE 2

| Product | Organotrialkoxysilane (g) | POS (g) | Conditions (°C., h) | Viscosity (cP) |
|---|---|---|---|---|
| 1a | 5.8 | 58 | 25° C., 5 min | — |
| 1b | 5.8 | 58 | 120° C., 23 h | 170 |
| 1c | 5.8 | 58 | 100° C., 4 h | 47 |
| 1d | 10.6 | 53 | 100° C., 21 h | 119 |
| 1e | 53 | 265 | 120° C., 16 h | 26 |
| 1f | 5.8 | 58 | 25° C., 5 min | — |
| 1g | 5.8 | 58 | 120° C., 18 h | 541 |
| 1h | 5.8 | 58 | 100° C., 4 h | 1180 |
| 1i | 5.8 | 58 | 100° C., 2 h | 511 |
| 1j | 10.6 | 53 | 100° C., 2 h | 26 | copious amounts of methanol HPLC grade, J.T. Baker, Phillipsburgh, N.J.), water and then methanol. The particles were then dried at 80° C. at a reduced pressure for 16 hours. Specific amounts of starting materials used to prepare these products are listed in Table 3. The specific surface areas (SSA), specific pore volumes (SPV) and the average pore diameters (APD) of these materials were measured using the multi-point $N_2$ sorption method and are listed in Table 3 (Micromeritics ASAP 2400; Micromeritics Instruments Inc., Norcross, Ga., or equivalent). The specific surface area was calculated using the BET method, the specific pore volume was the single point value determined for $P/P_0 > 0.98$, and the average pore diameter was calculated from the desorption leg of the isotherm using the BJH method. The % C, % H, % N of these materials were measured by combustion analysis (CE-440 Elemental Analyzer; Exeter Analytical Inc., North Chelmsford, Mass., or equivalent).

TABLE 3

| Product | POS Reagent | POS (g) | Triton X100 (g) | EtOH (g) | H₂O (g) | NH₄OH (mL) | % C | % H | % N | SSA (m²/g) | SPV (cm³/g) | APD (Å) |
|---|---|---|---|---|---|---|---|---|---|---|---|---|
| 2a | 1a | 63.8 | 5.6 | 52 | 280 | 44 | 2.39 | 0.96 | 0.06 | 319 | 0.64 | 77 |
| 2b | 1b | 63.8 | 5.6 | 52 | 280 | 44 | 3.50 | 1.16 | 0.00 | 431 | 0.82 | 68 |
| 2c | 1c | 63.8 | 5.6 | 52 | 280 | 44 | 1.62 | 0.95 | 0.00 | 327 | 0.64 | 78 |
| 2d | 1d | 63.8 | 5.6 | 52 | 280 | 44 | 7.11 | 2.03 | 0.00 | 511 | 0.82 | 51 |
| 2e | 1e | 286.2 | 25.2 | 234 | 1260 | 198 | 5.54 | 1.80 | 0.05 | 460 | 0.69 | 49 |
| 2f | 1f | 63.8 | 5.6 | 52 | 280 | 44 | 7.29 | 1.79 | 0.98 | 366 | 0.56 | 57 |
| 2g | 1g | 63.8 | 5.6 | 52 | 280 | 44 | 6.96 | 1.82 | 0.86 | 396 | 0.51 | 49 |
| 2h | 1h | 63.8 | 5.6 | 52 | 280 | 44 | 8.55 | 2.52 | 1.26 | 376 | 0.40 | 42 |
| 2i | 1i | 63.8 | 5.6 | 52 | 280 | 44 | 8.06 | 2.78 | 1.22 | 437 | 0.41 | 38 |
| 2j | 1j | 63.6 | 5.6 | 52 | 280 | 44 | 12.63 | 3.46 | 1.92 | 344 | 0.33 | 42 |

Example 2

A mixture of Triton® X-100 (Dow Chemical, Midland, Mich.), ethanol (anhydrous, J.T. Baker, Phillipsburgh, N.J.), and deionized water was heated at 55° C. for 0.5 h. Using a rotor/stator mixer (Model 100L, Charles Ross & Son Co., Hauppauge, N.Y.), a organosiloxane/POS mixture from example 1 was emulsified in the ethanol/water/triton mixture. Thereafter, 14.8 M ammonium hydroxide (NH₄OH; J.T. Baker, Phillipsburgh, N.J.) was added into the emulsion to gel the emulsion beads. Suspended in the solution, the gelled product was transferred to a flask and stirred at 55° C. for 16 h. Thereafter, the emulsion was agitated mechanically at 80° C. for 16-24 hours. Upon cooling, the suspension of formed particles was filtered and then washed consecutively with Example 3

Spherical, porous, hybrid inorganic/organic particles of Examples 2 were mixed with 0.1 M tris(hydroxymethyl)aminomethane (TRIS, Aldrich Chemical, Milwaukee, Wis.) aqueous solution, yielding a 16% by weight slurry. The resultant slurry was then enclosed in a stainless steel autoclave and heated to between 145° C. for 20 hours. After the autoclave cooled to room temperature the product was filtered and washed repeatedly using water and methanol (HPLC grade, J.T. Baker, Phillipsburgh, N.J.), and then dried at 80° C. under vacuum for 16 hours. Specific hydrothermal conditions are listed in Table 4 (mL of base solution/gram of hybrid silica particle, concentration and pH of initial TRIS solution, reaction temperature). The specific surface areas (SSA), specific pore volumes (SPV), the average pore diameters (APD) and the % C of these materials are listed in Table 4 and were measured as described in Examples 2.

TABLE 4

| Product | Precursor | pH | % C | % N | SSA (m²/g) | SPV (cc/g) | APD (Å) | Loss in SSA (m²/g) | MPA (m²/g) | % μP |
|---|---|---|---|---|---|---|---|---|---|---|
| 3a | 2c | 9.53 | 0.15 | 0.00 | 90 | 0.56 | 230 | 237 | 19 | 21 |
| 3b | 2d | 9.57 | 3.57 | 0.00 | 211 | 0.95 | 152 | 300 | 13 | 6 |
| 3c | 2e | 9.43 | 3.17 | 0.00 | 199 | 0.72 | 129 | 261 | 18 | 9 |
| 3d | 2g | 9.60 | 6.28 | 0.93 | 89 | 0.40 | 140 | 307 | 15 | 17 |
| 3e | 2i | 9.51 | 5.87 | 0.83 | 42 | 0.24 | 167 | 395 | 7 | 17 |
| 3f | 2j | 9.71 | 8.34 | 1.17 | 47 | 0.26 | 167 | 297 | 9 | 19 |

Example 4

The particles of hybrid materials prepared according to Examples 3c were separated by particle size into 4.4 and 11.7 μm fractions (Table 5, entries 4a and 4b). The surface of these materials fraction were modified with chlorodimethyloctadecylsilane (CDMO, Aldrich Chemical, Milwaukee, Wis.), using imidazole (Aldrich Chemical, Milwaukee, Wis.) in refluxing toluene (110° C., 4 hours). The reaction was then cooled and the product was filtered and were washed successively with water, toluene, 1:1 v/v acetone/water, and acetone (all solvents from J.T. Baker), and then dried at 80° C. under reduced pressure for 16 hours. Reaction data is listed in Table 6 and were measured as described in Examples 2. The surface concentration of octadecylsilyl groups was determined to be 3.2-3.4 μmol/m² by the difference in particle % C before and after the surface modification as measured by elemental analysis.

TABLE 5

| Product | Unsized Precursor | dp₅₀ vol % (μm) | 90/10 ratio | % C | SSA (m²/g) | SPV (cc/g) | APD (Å) | MPA (m²/g) | % μP |
|---|---|---|---|---|---|---|---|---|---|
| 4a | 3c | 4.37 | 1.47 | 0.75 | 236 | 0.68 | 114 | 49 | 21 |
| 4b | 3c | 11.66 | 1.70 | 1.88 | 219 | 0.90 | 156 | 36 | 16 |

TABLE 6

| Product | Precursor | Hybrid (g) | CDMO (g) | Imidazole (g) | Toluene (mL) | % C | $C_{18}$ Coverage (μmol/m²) |
|---|---|---|---|---|---|---|---|
| 5a | 4a | 3.5 | 2.87 | 0.67 | 17.5 | 15.2 | 3.17 |
| 5b | 4b | 48 | 36.5 | 8.59 | 240 | 15.9 | 3.37 |

Example 5

The surface of $C_{18}$-bonded hybrid materials 5a and 5b were further modified with trimethylchlorosilane (TMCS, Aldrich Chemical, Milwaukee, Wis.), using imidazole (Aldrich Chemical, Milwaukee, Wis.) in refluxing toluene (110° C., 4 hours). The reaction was then cooled and the product was filtered and were washed successively with water, toluene, 1:1 v/v acetone/water, and acetone (all solvents from J.T. Baker), and then dried at 80° C. under reduced pressure for 16 hours. Reaction data is listed in Table 7 and were measured as described in Examples 2.

TABLE 7

| Product | Precursor | Hybrid (g) | TMSC (g) | Imidazole (g) | Toluene (mL) | % C |
|---|---|---|---|---|---|---|
| 6a | 5a | 4.0 | 1.03 | 0.77 | 20.0 | 15.38 |
| 6b | 5b | 55 | 13.1 | 9.84 | 275 | 16.03 |

Example 6

Following the method described in U.S. Pat. No. 6,686,035, one or more organoalkoxysilanes alone or in combination with a one or more alkoxysilanes (all from Gelest Inc., Tullytown, Pa.) listed Table 8 below are mixed with an alcohol (HPLC grade, J.T. Baker, Phillipsburgh, N.J.) and 0.1 N hydrochloric acid (Aldrich Chemical, Milwaukee, Wis.) in a flask. The resulting solution is agitated and refluxed for 16 h in an atmosphere of argon or nitrogen. Alcohol is removed from the flask via distillation at atmospheric pressure. Residual alcohol and volatile species are removed by heating at 115-140° C. for 1-2 h in a sweeping stream of argon or nitrogen or by heating at 125° C. under reduced pressure for 1-2 h. The resulting polyorganoalkoxysiloxanes (POS) are colorless viscous liquids.

TABLE 8

| Organoalkoxysilanes Chemical Formula | Alkoxysilane Chemical Formula |
|---|---|
| $H_2C=C(CH_3)CO_2C_3H_6Si(OCH_3)_3$, $H_2C=CHC_6H_4(CH_2)_2Si(OCH_3)_3$, $H_2C=CHSi(OCH_2CH_3)_3$, $CH_3Si(OCH_2CH_3)_3$. $C_2H_5Si(OCH_2CH_3)_3$, $C_6H_5Si(OCH_2CH_3)_3$, $(CH_3CH_2O)_3Si(CH_2)_2Si(OCH_2CH_3)_3$ | $Si(OCH_3)_4$, $Si(OCH_2CH_3)_4$ |

Example 7

1,1-Dimethyl-1-Sila-2-Oxacyclohexane (DMSOH, Gelest Inc., Tullytown, N.J.), N-n-Butyl-AZA-2,2-dimethoxysilacyclopentane (BADMSP, Gelest Inc., Tullytown, N.J.), or N-Methyl-AZA-2,2,4-trimethylsilacyclopentane (MATMSP, Gelest Inc., Tullytown, N.J.) are added to a methacryloxypropyl or vinyl containing POS selected from Example 6, in a flask and is agitated at 25-120° C. for 24 hours under a nitrogen atmosphere. This product is then mixed under a nitrogen purge at ambient temperature for 0.5 hours with divinylbenzene (DVB; 80%; Dow Chemical, Midland, Mich.; washed 3× in 0.1 N NaOH, 3× in water, and then dried MgSO$_4$ from Aldrich Chemical), 2,2'-azobisisobutyronitrile (AIBN; 98%, Aldrich Chemical), and one or more of the following reagents: toluene (HPLC grade, J.T. Baker, Phillipsburgh, N.J.), cyclohexanol (CXL; Aldrich, Milwaukee, Wis.), dibutylphthalate (DBP; Sigma; Milwaukee, Wis.), Triton® X-45 (Oil X-45; Fluka, Milwaukee, Wis.). In a separate flask, a solution of Triton® X-45 (Aq X-45; Fluka, Milwaukee, Wis.) or Triton® X-100 (Aq X-100; Fluka, Milwaukee, Wis.) and tris(hydroxymethyl)aminomethane lauryl sulfate (TDS; Fluka, Milwaukee, Wis.) in water and ethanol is prepared by mixing and heating to 60° C. for 0.5-1.0 hours. The two solutions are combined and then emulsified using a rotor/stator mixer (Model 100L, Charles Ross & Son Co., Hauppauge, N.Y.) for 4 minutes under an argon flow. Next, a solution of 14.8 M ammonium hydroxide (NH$_4$OH; J. T. Baker, Phillipsburgh, N.J.) is added to the emulsion over a minute, and the emulsification continues for 20 minutes. Thereafter, the emulsion is agitated mechanically at 80° C. for 16-24 hours. Upon cooling, the suspension of formed particles is filtered and is then washed consecutively with copious amounts of methanol, water and then methanol.

INCORPORATION BY REFERENCE

The entire contents of all patents, published patent applications and other references cited herein are hereby expressly incorporated herein in their entireties by reference.

EQUIVALENTS

Those skilled in the art will recognize, or be able to ascertain using no more than routine experimentation, numerous equivalents to the specific procedures described herein. Such equivalents are considered to be within the scope of this invention and are covered by the following claims.

What is claimed is:

1. A porous inorganic/organic homogenous copolymeric hybrid material, comprising two or more repeat units, wherein at least one repeat unit is an organosilane repeat unit D, and wherein the material has the formula $(A)_w(B)_x(C)_y(D)_z$ wherein the order of repeat units A, B, C, and D may be random, block, or a combination of random and block and wherein:
A is an organic repeat unit which is covalently bonded to one or more repeat units A, B, or D via an organic bond;
B is an organosiloxane repeat unit which is bonded to: one or more repeat units A, B, or D via an organic bond; one or more repeat units B, C, or D via an inorganic bond; or one or more repeat units D via a carbon-heteroatom-silicon bond;
C is an inorganic repeat unit which is bonded to: one or more repeat units B, C, or D via an inorganic bond; or one or more repeat units D via a carbon-heteroatom-silicon bond;
D is an organosilane repeat unit and is bonded to: one or more repeat units A, B, or D via an organic bond; one or more repeat units B, C, or D via an inorganic bond; or one or more repeat units B, C, or D via a carbon-heteroatom-silicon bond;

w, x, and y are each independently positive numbers or zero, wherein w+x+y>0; and
z is a positive number;
wherein A is selected from the group consisting of

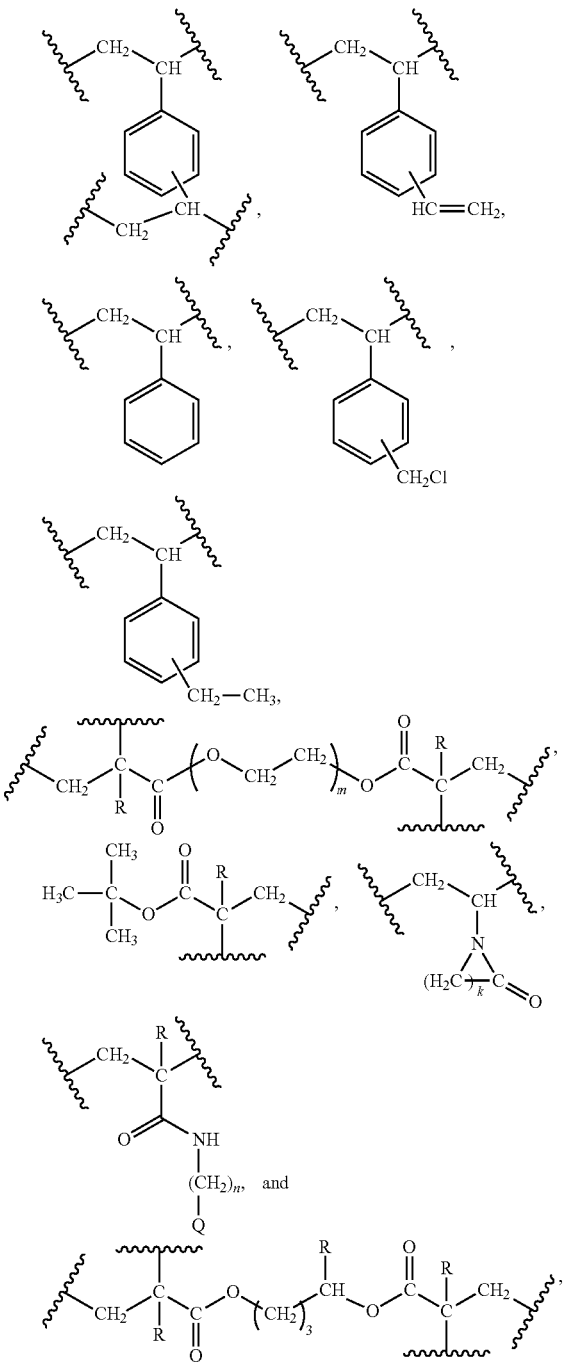

wherein
each R is independently H or a C$_1$-C$_{10}$ alkyl group;
k is an integer from 3-6;
m is an integer of from 1 to 20;
n is an integer of from 0 to 10; and
Q is hydrogen, N(C$_{1-6}$alkyl)$_3$, N(C$_{1-6}$alkyl)$_2$(C$_{1-6}$alkylene-SO$_3$), or C(C$_{1-6}$hydroxy alkyl)$_3$, wherein B is selected from the group consisting of
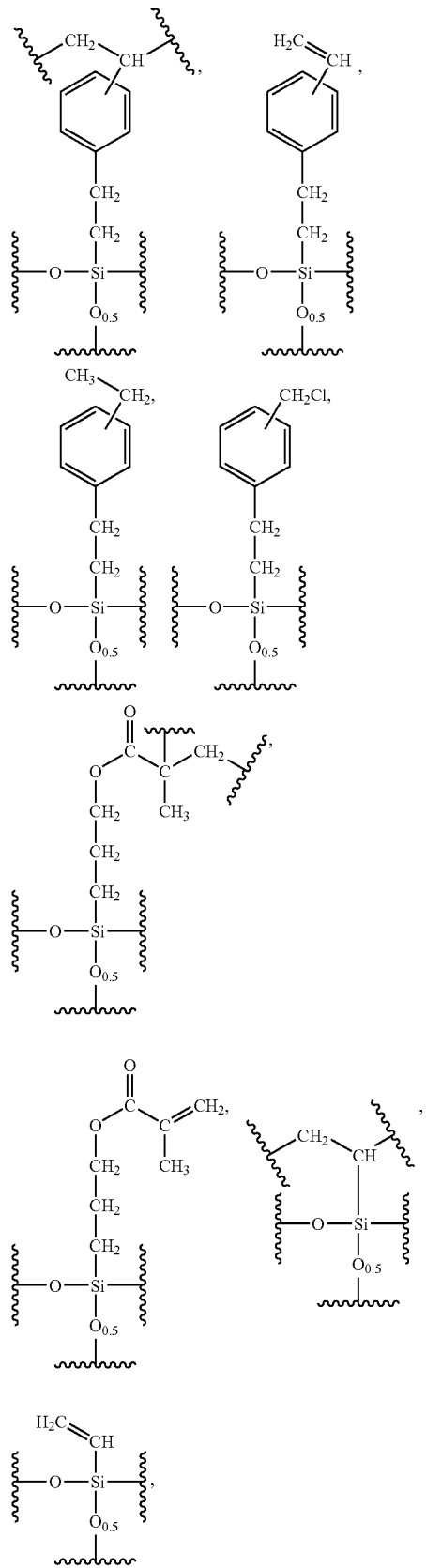
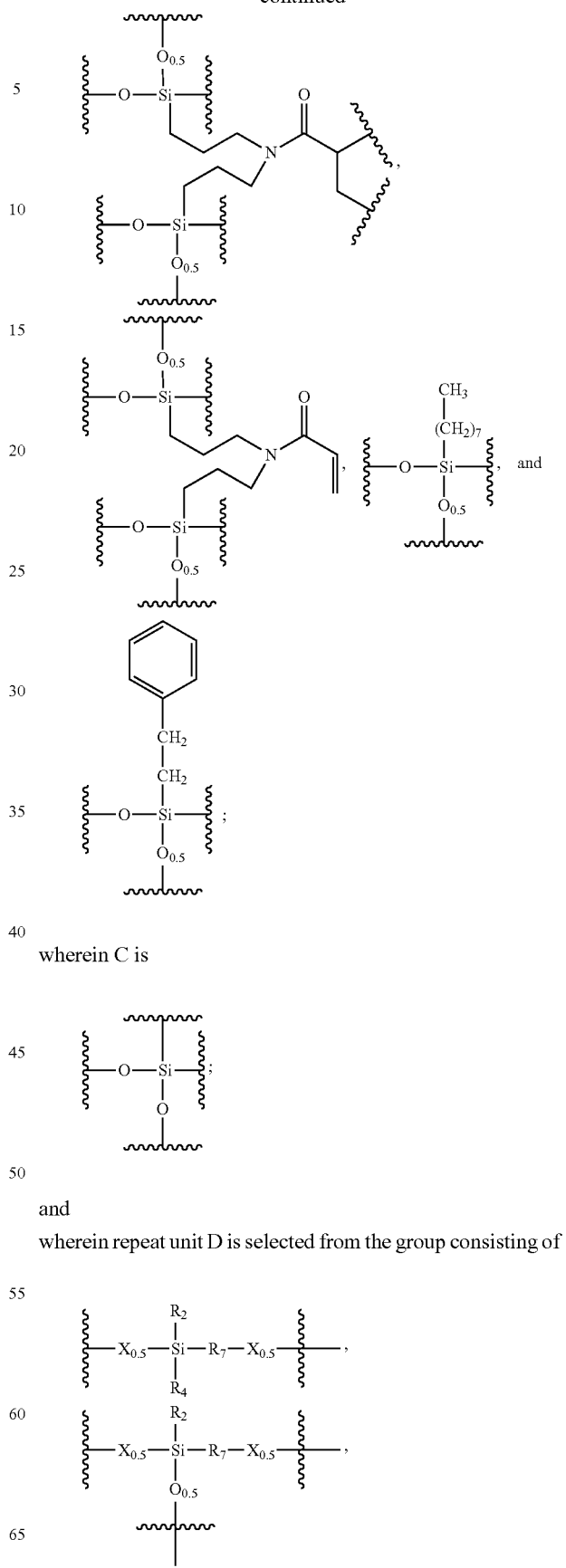
wherein C is
and
wherein repeat unit D is selected from the group consisting of -continued

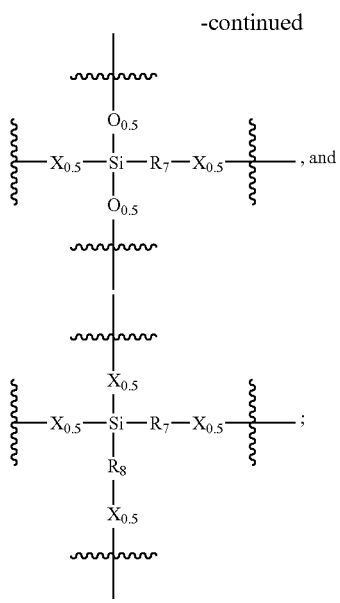

wherein R$_2$ and R$_4$ are each independently C$_1$-C$_{18}$ alkyl, C$_2$-C$_{18}$ alkenyl, C$_2$-C$_{18}$ alkynyl, C$_3$-C$_{18}$ cycloalkyl, C$_3$-C$_{18}$ heterocycloalkyl, C$_5$-C$_{18}$ aryl, or C$_5$-C$_{18}$ heteroaryl;

each R$_7$ or R$_8$ is independently C$_1$-C$_{18}$ alkyl, C$_2$-C$_{18}$ alkenyl, C$_2$-C$_{18}$ alkenylene, C$_2$-C$_{18}$ alkynyl, C$_3$-C$_{18}$ cycloalkyl, C$_3$-C$_{18}$ heterocycloalkyl, C$_5$-C$_{18}$ aryl, C$_5$-C$_{18}$ arylene, C$_5$-C$_{18}$ heteroaryl, or C$_5$-C$_{18}$ heteroarylene, wherein each of R$_7$ and R$_8$ may be optionally substituted;

X is O, NR$_A$, or S(O)$_q$;

R$_A$ is C$_1$-C$_6$ alkyl, C$_2$-C$_{18}$ alkenyl, C$_3$-C$_{18}$ cycloalkyl, C$_3$-C$_{18}$ heterocycloalkyl, C$_5$-C$_{18}$ aryl, or C$_5$-C$_{18}$ heteroaryl; and q is 0-2.

2. The material of claim 1, wherein the two or more repeat units are linked by at least one carbon-heteroatom-silicon linker.

3. The material of claim 2, wherein the heteroatom in the carbon-heteroatom-silicon linker is O, N, or S.

4. The material of claim 1, wherein w and x are 0, providing a material of the formula:

$$(C)_y(D)_z$$

wherein the order of repeat units C and D may be random, block, or a combination of random and block;
- C is an inorganic repeat unit which is bonded to: one or more repeat units C or D via an inorganic bond; or one or more repeat units D via a carbon-heteroatom-silicon bond;
- D is an organosilane repeat unit which is bonded to: one or more repeat units C or D via an inorganic bond; one or more repeat units C or D via a carbon-heteroatom-silicon bond; or one or more repeat units D via an organic bond; and
- y and z are positive numbers.

5. The material of claim 1, wherein D is bonded to one or more repeat units of B, C, or D via a carbon-heteroatom-silicon bond.

6. The material of claim 1, wherein D is bonded to one or more repeat units of B, C, or D via a carbosiloxane bond (C—O—Si).

7. The material of claim 1, wherein the silicon atom of the group D monomer is attached to the heteroatom of the carbon-heteroatom-silicon linker.

8. The material of claim 1, wherein the silicon atom of the group D monomer is attached to a carbon atom.

9. The material of claim 1, wherein the carbon-heteroatom-silicon functionality is incorporated into the material via a ring opening reaction of a heterocyclic silane compound.

10. The material of claim 9, wherein the heterocyclic silane is selected from the group consisting of

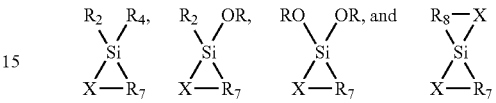

wherein
- each R is independently C$_1$-C$_{18}$ alkyl, C$_2$-C$_{18}$ alkenyl, C$_2$-C$_{18}$ alkynyl, C$_3$-C$_{18}$ cycloalkyl, C$_3$-C$_{18}$ heterocycloalkyl, C$_5$-C$_{18}$ aryl, C$_5$-C$_{18}$ heteroaryl, C$_6$-C$_{18}$ aralkyl, C$_6$-C$_{18}$ heteroaralkyl, —Si(R$^c$)$_4$, —C(O)R$^c$, —C(S)R$^c$, —C(NR)R$^c$, —S(O)R$^c$, —S(O)$_2$R$^c$, —P(O)R$^c$R$^c$, or —P(S)R$^c$R$^c$;
- each R$^c$ is independently, H, C$_1$-C$_{18}$ alkyl, C$_2$-C$_{18}$ alkenyl, C$_2$-C$_{18}$ alkynyl, C$_3$-C$_{18}$ cycloalkyl, C$_3$-C$_{18}$ heterocycloalkyl, C$_5$-C$_{18}$ aryl, C$_5$-C$_{18}$ heteroaryl, —OC$_1$-C$_{18}$ alkyl; —OC$_5$-C$_{18}$ aryl; —OC$_3$-C$_{18}$ heterocycloalkyl, —OC$_5$-C$_{18}$ heteroaryl, —NHC$_1$-C$_{18}$ alkyl; or —N(C$_1$-C$_{18}$ alkyl)$_2$;
- R$_2$ and R$_4$ are each independently C$_1$-C$_{18}$ alkyl, C$_2$-C$_{18}$ alkenyl, C$_2$-C$_{18}$ alkynyl, C$_3$-C$_{18}$ cycloalkyl, C$_3$-C$_{18}$ heterocycloalkyl, C$_5$-C$_{18}$ aryl, or C$_5$-C$_{18}$ heteroaryl;
- each R$_7$ or R$_8$ is independently C$_1$-C$_{18}$ alkyl, C$_2$-C$_{18}$ alkenyl, C$_2$-C$_{18}$ alkenylene, C$_2$-C$_{18}$ alkynyl, C$_3$-C$_{18}$ cycloalkyl, C$_3$-C$_{18}$ heterocycloalkyl, C$_5$-C$_{18}$ aryl, C$_5$-C$_{18}$ arylene, C$_5$-C$_{18}$ heteroaryl, or C$_5$-C$_{18}$ heteroarylene, wherein each of R$_7$ and R$_8$ may be optionally substituted;
- X is O, NR$_A$, or S(O)$_q$;
- R$_A$ is C$_1$-C$_6$ alkyl, C$_3$-C$_{18}$ cycloalkyl, C$_3$-C$_{18}$ heterocycloalkyl, C$_5$-C$_{18}$ aryl, or C$_5$-C$_{18}$ heteroaryl; and
- q is 0-2.

11. The material of claim 1, wherein each R is independently hydrogen, methyl, ethyl, or propyl.

12. The material of claim 1, wherein organic bonds are formed via chain addition.

13. The material of claim 12, wherein the organic bonds are formed between: an organic olefin monomer and an alkenyl-functionalized silane monomer; an organic olefin monomer and an organic olefin monomer; an organic olefin monomer and a heterocyclic silane monomer; an alkenyl-functionalized silane monomer and an alkenyl-functionalized silane monomer; an alkenyl-functionalized silane monomer and a heterocyclic silane monomer; or a heterocyclic silane monomer and a heterocyclic silane monomer.

14. The material of claim 13, wherein:
(a) the organic olefin monomer is selected from the group consisting of divinylbenzene, styrene, vinylbenzylchloride, ethylene glycol dimethacrylate, 1-vinyl-2-pyrrolidinone, N-vinylcaprolactam, tert-butylmethacrylate, acrylamide, methacrylamide, N,N'-(1,2-dihydroxyethylene)bisacrylamide, N,N'-ethylenebisacrylamide, N,N'-methylenebisacrylamide, butyl acrylate, ethyl acrylate, methyl acrylate, 2-(acryloxy)-2-hydroxypropyl methacrylate, 3-(acryloxy)-2-hydroxypropyl methacrylate, trimethylolpropane triacrylate, trimethylolpropane ethoxylate triacrylate, tris[(2-acryloyloxy)ethyl]isocyanurate, acrylonitrile, methacrylonitrile, itaconic acid, methacrylic acid, trimethylsilylmethacrylate, N-[tris(hydroxymethyl)methyl]acrylamide, (3-acrylamidopropyl)trimethylammonium chloride, [3-(methacryloylamino)propyl]dimethyl(3-sulfopropyl)ammonium hydroxide inner salt,

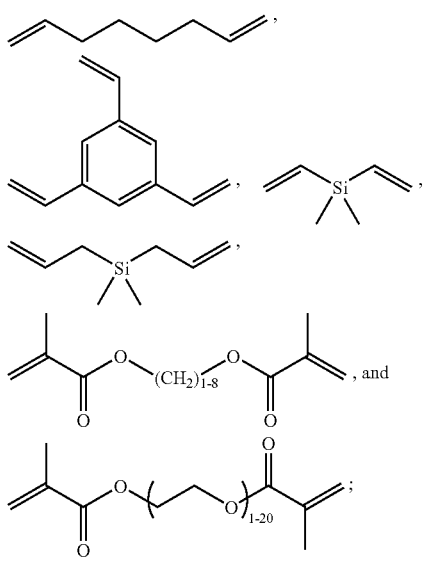

and the heterocyclic silane is selected from group consisting of:

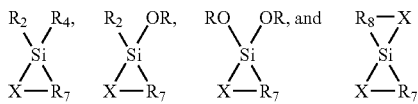

wherein each R is independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, $C_6$-$C_{18}$ aralkyl, $C_6$-$C_{18}$ heteroaralkyl, —Si($R^c$)$_4$, —C(O)$R^c$, —C(S)$R^c$, —C(NR)$R^c$, —S(O)$R^c$, —S(O)$_2$$R^c$, —P(O)$R^c$$R^c$, or —P(S)$R^c$$R^c$;

each $R^c$ is independently, H, $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, —O$C_1$-$C_{18}$ alkyl; —O$C_5$-$C_{18}$ aryl; —O$C_3$-$C_{18}$ heterocycloalkyl, —O$C_5$-$C_{18}$ heteroaryl, —NH$C_1$-$C_{18}$ alkyl; or —N($C_1$-$C_{18}$ alkyl)$_2$;

$R_2$ and $R_4$ are each independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, or $C_5$-$C_{18}$ heteroaryl;

each $R_7$ or $R_8$ is independently $C_1$-$C_{18}$ alkyl, $C_2$-$C_{18}$ alkenyl, $C_2$-$C_{18}$ alkenylene, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ arylene, $C_5$-$C_{18}$ heteroaryl, or $C_5$-$C_{18}$ heteroarylene, wherein each of $R_7$ and $R_8$ may be optionally substituted;

X is O, $NR_A$, or $S(O)_q$;

$R_A$ is $C_1$-$C_6$ alkyl, $C_3$-$C_{18}$ cycloalkyl, $C_3$-$C_{18}$ heterocloalkyl, $C_5$-$C_{18}$ aryl, or $C_5$-$C_{18}$ heteroaryl; and q is 0-2;

(b) wherein the alkenyl-functionalized silane monomer is selected from the group consisting of methacryloxypropyl trimethoxysilane, methacryloxypropyltriethoxysilane, vinyltriethoxysilane, vinyltrimethoxysilane, N-(3-acryloxy-2-hydroxypropyl)-3-aminopropyl triethoxysilane, (3-acryloxypropyl)trimethoxysilane, O-(methacryloxyethyl)-N-(triethoxysilylpropyl)urethane, N-(3-methacryloxy-2-hydroxypropyl)-3-aminopropyl triethoxysilane, methacryloxy methyltriethoxysilane, methacryloxymethyl trimethoxysilane, methacryloxypropy methyldiethoxysilane, methacryloxypropylmethyldimethoxysilane, methacryl oxypropyltris(methoxyethoxy)silane, 3-(N-styrylmethyl-2-aminoethylamino)propyltrimethoxysilane hydrochloride,

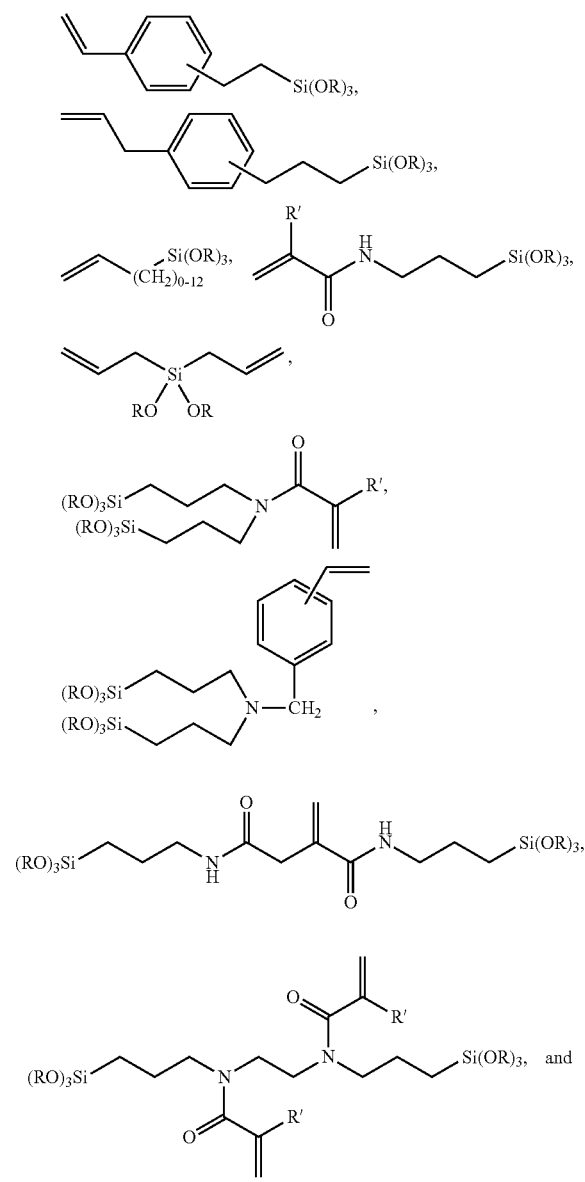

-continued

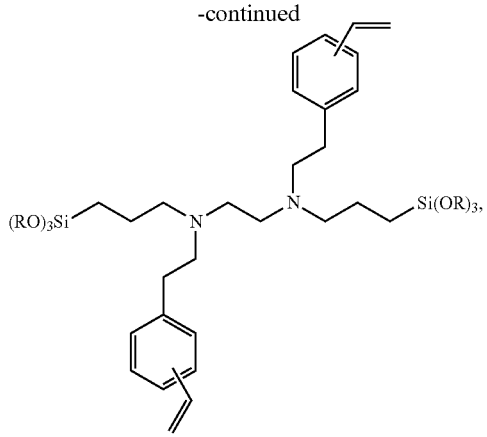

wherein
each R is independently H or a $C_1$-$C_{10}$ alkyl group and wherein R' is independently H or a $C_1$-$C_{10}$ alkyl group; and
the heterocyclic silane is selected from group consisting of

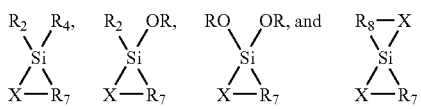

wherein
each R is independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, $C_6$-$C_{18}$ aralkyl, $C_6$-$C_{18}$ heteroaralkyl, —Si(R$^c$)$_4$, —C(O)R$^c$, —C(S)R$^c$, —C(NR)R$^c$, —S(O)R$^c$, —S(O)$_2$R$^c$, —P(O)R$^c$R$^c$, or —P(S)R$^c$R$^c$;

each R$^c$ is independently, H, $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, —OC$_1$-$C_{18}$ alkyl; —OC$_5$-$C_{18}$ aryl; —OC$_3$-$C_{18}$ heterocycloalkyl, —OC$_5$-$C_{18}$ heteroaryl, —NHC$_1$-$C_{18}$ alkyl; or —N(C$_1$-C$_{18}$ alkyl)$_2$;

R$_2$ and R$_4$ are each independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, or $C_5$-$C_{18}$ heteroaryl;

each R$_7$ or R$_8$ is independently $C_1$-$C_{18}$ alkyl, $C_2$-$C_{18}$ alkenyl, $C_2$-$C_{18}$ alkenylene, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ arylene, $C_5$-$C_{18}$ heteroaryl, or $C_5$-$C_{18}$ heteroarylene, wherein each of R$_7$ and R$_8$ may be optionally substituted;

X is O, NR$_A$, or S(O)$_q$;
R$_A$ is $C_1$-$C_6$ alkyl, $C_3$-$C_{18}$ cycloalkyl, $C_3$-$C_{18}$ heterocycloalkyl, $C_5$-$C_{18}$ aryl, or $C_5$-$C_{18}$ heteroaryl; and
q is 0-2; or (c) wherein each heterocyclic silane monomer is independently selected from the group consisting of

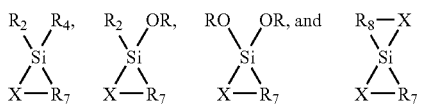

wherein
each R is independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, $C_6$-$C_{18}$ aralkyl, $C_6$-$C_{18}$ heteroaralkyl, —Si(R$^c$)$_4$, —C(O)R$^c$, —C(S)R$^c$, —C(NR)R$^c$, —S(O)R$^c$, —S(O)$_2$R$^c$, —P(O)R$^c$R$^c$, or —P(S)R$^c$R$^c$;

each R$^c$ is independently, H, $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, —OC$_1$-$C_{18}$ alkyl; —OC$_5$-$C_{18}$ aryl; —OC$_3$-$C_{18}$ heterocycloalkyl, —OC$_5$-$C_{18}$ heteroaryl, —NHC$_1$-$C_{18}$ alkyl; or —N(C$_1$-C$_{18}$ alkyl)$_2$;

R$_2$ and R$_4$ are each independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, or $C_5$-$C_{18}$ heteroaryl;

each R$_7$ or R$_8$ is independently $C_1$-$C_{18}$ alkyl, $C_2$-$C_{18}$ alkenyl, $C_2$-$C_{18}$ alkenylene, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ arylene, $C_5$-$C_{18}$ heteroaryl, or $C_5$-$C_{18}$ heteroarylene, wherein each of R$_7$ and R$_8$ may be optionally substituted;

X is O, NR$_A$, or S(O)$_q$;
R$_A$ is $C_1$-$C_6$ alkyl, $C_3$-$C_{18}$ cycloalkyl, $C_3$-$C_{18}$ heterocycloalkyl, $C_5$-$C_{18}$ aryl, or $C_5$-$C_{18}$ heteroaryl; and
q is 0-2.

15. The material of claim 1 wherein inorganic bonds are formed via step condensation.

16. The material of claim 15, wherein the organic bonds are formed between: an organic olefin monomer and an alkenyl-functionalized silane monomer; an organic olefin monomer and an organic olefin monomer; an organic olefin monomer and a heterocyclic silane monomer; an alkenyl-functionalized silane monomer and an alkenyl-functionalized silane monomer; an alkenyl-functionalized silane monomer and a heterocyclic silane monomer; or a heterocyclic silane monomer and a heterocyclic silane monomer.

17. The material of claim 16, wherein:
(a) the alkenyl-functionalized silane monomer is selected from the group consisting of methacryloxypropyltrimethoxysilane, methacryloxypropyltriethoxysilane, vinyltriethoxysilane, vinyltrimethoxysilane, N-(3-acryloxy-2-hydroxypropyl)-3-aminopropyltriethoxysilane, (3-acryloxypropyl)trimethoxysilane, O-(methacryloxyethyl)-N-(triethoxysilylpropyl)urethane, N-(3-methacryloxy-2-hydroxypropyl)-3-aminopropyltriethoxysilane, methacryloxymethyltriethoxysilane, methacryloxymethyltrimethoxysilane, methacryloxypropylmethyldiethoxysilane, methacryloxypropylmethyldimethoxysilane, methacryloxypropyltris(methoxyethoxy)silane, 3-(N-styrylmethyl-2-aminoethylamino)propyltrimethoxysilane hydrochloride,

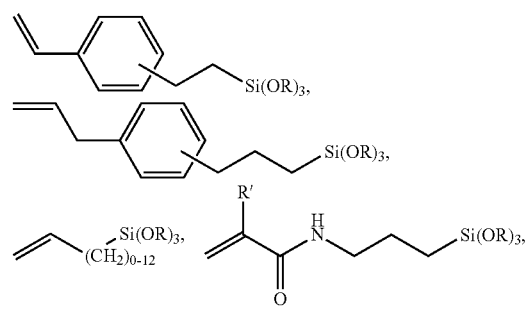

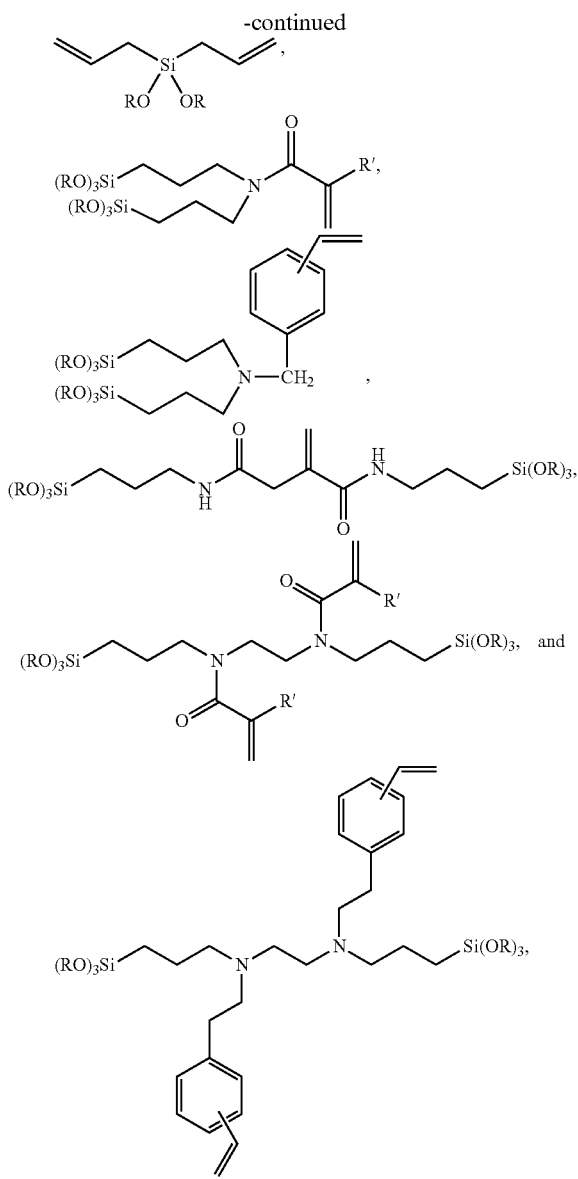

wherein
each R is independently H or a $C_1$-$C_{10}$ alkyl group and wherein R' is independently H or a $C_1$-$C_{10}$ alkyl group; and
the heterocyclic silane is selected from group consisting of

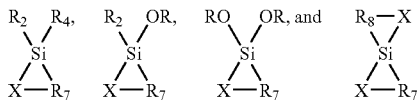

wherein
each R is independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, $C_6$-$C_{18}$ aralkyl, $C_6$-$C_{18}$ heteroaralkyl, —Si($R^c$)$_4$, —C(O)$R^c$, —C(S)$R^c$, —C(NR)$R^c$, —S(O)$R^c$, —S(O)$_2R^c$, —P(O)$R^cR^c$, or —P(S)$R^cR^c$;
each $R^c$ is independently, H, $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, —OC$_1$-$C_{18}$ alkyl; —OC$_5$-$C_{18}$ aryl; —OC$_3$-$C_{18}$ heterocycloalkyl, —OC$_5$-$C_{18}$ heteroaryl, —NHC$_1$-$C_{18}$ alkyl; or —N(C$_1$-$C_{18}$ alkyl)$_2$;
$R_2$ and $R_4$ are each independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, or $C_5$-$C_{18}$ heteroaryl;
each $R_7$ or $R_8$ is independently $C_1$-$C_{18}$ alkyl, $C_2$-$C_{18}$ alkenyl, $C_2$-$C_{18}$ alkenylene, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ arylene, $C_5$-$C_{18}$ heteroaryl, or $C_5$-$C_{18}$ heteroarylene, wherein each of $R_7$ and $R_8$ may be optionally substituted;
X is O, $NR_A$, or $S(O)_q$;
$R_A$ is $C_1$-$C_6$ alkyl, $C_3$-$C_{18}$ cycloalkyl, $C_3$-$C_{18}$ heterocycloalkyl, $C_5$-$C_{18}$ aryl, or $C_5$-$C_{18}$ heteroaryl; and
q is 0-2;
(b) wherein the alkoxy silane monomer is selected from tetramethoxysilane, tetraethoxysilane, tetrapropoxysilane, and tetrabutoxysilane;
and the heterocyclic silane is selected from group consisting of

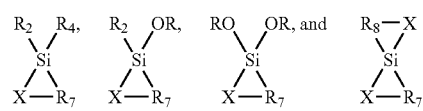

wherein
each R is independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, $C_6$-$C_{18}$ aralkyl, $C_6$-$C_{18}$ heteroaralkyl, —Si($R^c$)$_4$, —C(O)$R^c$, —C(S)$R^c$, —C(NR)$R^c$, —S(O)$R^c$, —S(O)$_2R^c$, —P(O)$R^cR^c$, or —P(S)$R^cR^c$;
each $R^c$ is independently, H, $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, —OC$_1$-$C_{18}$ alkyl; —OC$_5$-$C_{18}$ aryl; —OC$_3$-$C_{18}$ heterocycloalkyl, —OC$_5$-$C_{18}$ heteroaryl, —NHC$_1$-$C_{18}$ alkyl; or —N(C$_1$-$C_{18}$ alkyl)$_2$;
$R_2$ and $R_4$ are each independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, or $C_5$-$C_{18}$ heteroaryl;
each $R_7$ or $R_8$ is independently $C_1$-$C_{18}$ alkyl, $C_2$-$C_{18}$ alkenyl, $C_2$-$C_{18}$ alkenylene, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ arylene, $C_5$-$C_{18}$ heteroaryl, or $C_5$-$C_{18}$ heteroarylene, wherein each of $R_7$ and $R_8$ may be optionally substituted;
X is O, $NR_A$, or $S(O)_q$;
$R_A$ is $C_1$-$C_6$ alkyl, $C_3$-$C_{18}$ cycloalkyl, $C_3$-$C_{18}$ heterocycloalkyl, $C_5$-$C_{18}$ aryl, or $C_5$-$C_{18}$ heteroaryl; and
q is 0-2; or
(c) wherein each heterocyclic silane monomer is independently selected from the group consisting of

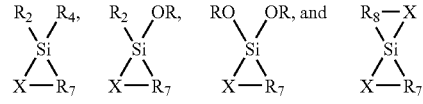

wherein
- each R is independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, $C_6$-$C_{18}$ aralkyl, $C_6$-$C_{18}$ heteroaralkyl, —Si($R^c$)$_4$, —C(O)$R^c$, —C(S)$R^c$, —C(NR)$R^c$, —S(O)$R^c$, —S(O)$_2R^c$, —P(O)$R^cR^c$, or —P(S)$R^cR^c$;
- each $R^c$ is independently, H, $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, —O$C_1$-$C_{18}$ alkyl; —O$C_5$-$C_{18}$ aryl; —O$C_3$-$C_{18}$ heterocycloalkyl, —O$C_5$-$C_{18}$ heteroaryl, —NH$C_1$-$C_{18}$ alkyl; or —N($C_1$-$C_{18}$ alkyl)$_2$;
- $R_2$ and $R_4$ are each independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, or $C_5$-$C_{18}$ heteroaryl;
- each $R_7$ or $R_8$ is independently $C_1$-$C_{18}$ alkyl, $C_2$-$C_{18}$ alkenyl, $C_2$-$C_{18}$ alkenylene, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ arylene, $C_5$-$C_{18}$ heteroaryl, or $C_5$-$C_{18}$ heteroarylene, wherein each of $R_7$ and $R_8$ may be optionally substituted;
- X is O, $NR_A$, or S(O)$_q$;
- $R_A$ is $C_1$-$C_6$ alkyl, $C_3$-$C_{18}$ cycloalkyl, $C_3$-$C_{18}$ heterocycloalkyl, $C_5$-$C_{18}$ aryl, or $C_5$-$C_{18}$ heteroaryl; and
- q is 0-2.

18. The material of claim 1 wherein carbon-heteroatom-silicon bonds are formed via ring opening.

19. The material of claim 18, wherein the ring opening bonds are formed between: an alkenyl-functionalized silane monomer and a heterocyclic silane monomer; an alkoxy silane monomer and a heterocyclic silane monomer; or a heterocyclic silane monomer and a heterocyclic silane monomer.

20. The material of claim 19, wherein:
(a) the alkenyl-functionalized silane monomer is selected from the group consisting of methacryloxypropyltrimethoxysilane, methacryloxypropyltriethoxysilane, vinyltriethoxysilane, vinyltrimethoxysilane, N-(3-acryloxy-2-hydroxypropyl)-3-aminopropyltriethoxysilane, (3-acryloxypropyl)trimethoxysilane, O-(methacryloxyethyl)-N-(triethoxysilylpropyl)urethane, N-(3-methacryloxy-2-hydroxypropyl)-3-aminopropyltriethoxysilane, methacryloxymethyltriethoxysilane, methacryloxymethyltrimethoxysilane, methacryloxypropylmethyldiethoxysilane, methacryloxypropylmethyldimethoxysilane, methacryloxypropyltris(methoxyethoxy)silane, 3-(N-styrylmethyl-2-aminoethylamino)propyltrimethoxysilane hydrochloride,

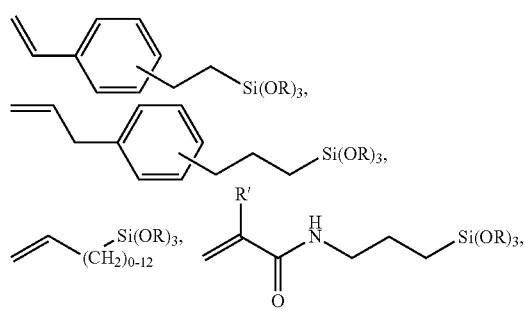

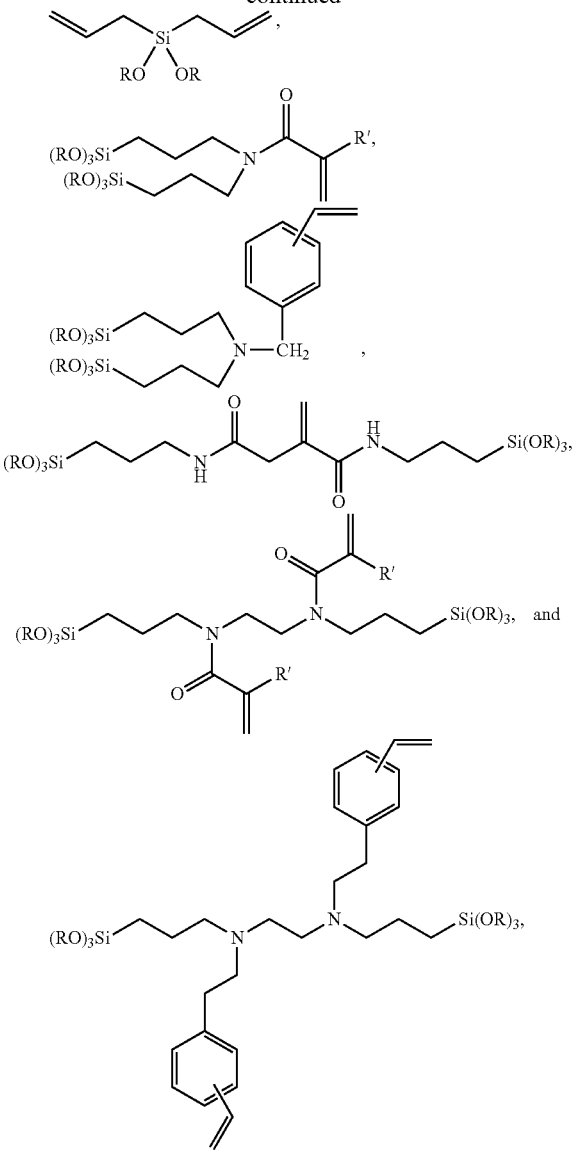

wherein
each R is independently H or a $C_1$-$C_{10}$ alkyl group and wherein R' is independently H or a $C_1$-$C_{10}$ alkyl group;
and the heterocyclic silane is selected from group consisting of:

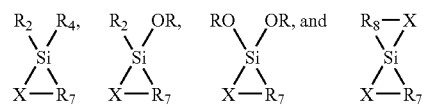

wherein
- each R is independently $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5$-$C_{18}$ aryl, $C_5$-$C_{18}$ heteroaryl, $C_6$-$C_{18}$ aralkyl, $C_6$-$C_{18}$ heteroaralkyl, —Si($R^c$)$_4$, —C(O)$R^c$, —C(S)$R^c$, —C(NR)$R^c$, —S(O)$R^c$, —S(O)$_2R^c$, —P(O)$R^cR^c$, or —P(S)$R^cR^c$;
- each $R^c$ is independently, H, $C_1$-$C_{18}$ alkyl, $C_2$-$C_{18}$ alkenyl, $C_2$-$C_{18}$ alkynyl, $C_3$-$C_{18}$ cycloalkyl, $C_3$-$C_{18}$ heterocycloalkyl, $C_5\text{-}C_{18}$ aryl, $C_5\text{-}C_{18}$ heteroaryl, $-OC_1\text{-}C_{18}$ alkyl; $-OC_5\text{-}C_{18}$ aryl; $-OC_3\text{-}C_{18}$ heterocycloalkyl, $-OC_5\text{-}C_{18}$ heteroaryl, $-NHC_1\text{-}C_{18}$ alkyl; or $-N(C_1\text{-}C_{18}$ alkyl$)_2$;

$R_2$ and $R_4$ are each independently $C_1\text{-}C_{18}$ alkyl, $C_2\text{-}C_{18}$ alkenyl, $C_2\text{-}C_{18}$ alkynyl, $C_3\text{-}C_{18}$ cycloalkyl, $C_3\text{-}C_{18}$ heterocycloalkyl, $C_5\text{-}C_{18}$ aryl, or $C_5\text{-}C_{18}$ heteroaryl;

each $R_7$ or $R_8$ is independently $C_1\text{-}C_{18}$ alkyl, $C_2\text{-}C_{18}$ alkenyl, $C_2\text{-}C_{18}$ alkenylene, $C_2\text{-}C_{18}$ alkynyl, $C_3\text{-}C_{18}$ cycloalkyl, $C_3\text{-}C_{18}$ heterocycloalkyl, $C_5\text{-}C_{18}$ aryl, $C_5\text{-}C_{18}$ arylene, $C_5\text{-}C_{18}$ heteroaryl, or $C_5\text{-}C_{18}$ heteroarylene, wherein each of $R_7$ and $R_8$ may be optionally substituted;

X is O, $NR_A$, or $S(O)_q$;

$R_A$ is $C_1\text{-}C_6$ alkyl, $C_3\text{-}C_{18}$ cycloalkyl, $C_3\text{-}C_{18}$ heterocycloalkyl, $C_5\text{-}C_{18}$ aryl, or $C_5\text{-}C_{18}$ heteroaryl; and q is 0-2;

(b) the alkoxy silane monomer is selected from tetramethoxysilane, tetraethoxysilane, tetrapropoxysilane, and tetrabutoxysilane;

and the heterocyclic silane is selected from group consisting of

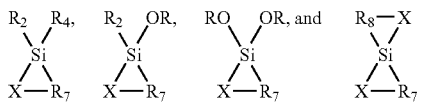

wherein each R is independently $C_1\text{-}C_{18}$ alkyl, $C_2\text{-}C_{18}$ alkenyl, $C_2\text{-}C_{18}$ alkynyl, $C_3\text{-}C_{18}$ cycloalkyl, $C_3\text{-}C_{18}$ heterocycloalkyl, $C_5\text{-}C_{18}$ aryl, $C_5\text{-}C_{18}$ heteroaryl, $C_6\text{-}C_{18}$ aralkyl, $C_6\text{-}C_{18}$ heteroaralkyl, $-Si(R^c)_4$, $-C(O)R^c$, $-C(S)R^c$, $-C(NR)R^c$, $-S(O)R^c$, $-S(O)_2R^c$, $-P(O)R^cR^c$, or $-P(S)R^cR^c$;

each $R^c$ is independently, H, $C_1\text{-}C_{18}$ alkyl, $C_2\text{-}C_{18}$ alkenyl, $C_2\text{-}C_{18}$ alkynyl, $C_3\text{-}C_{18}$ cycloalkyl, $C_3\text{-}C_{18}$ heterocycloalkyl, $C_5\text{-}C_{18}$ aryl, $C_5\text{-}C_{18}$ heteroaryl, $-OC_1\text{-}C_{18}$ alkyl; $-OC_5\text{-}C_{18}$ aryl; $-OC_3\text{-}C_{18}$ heterocycloalkyl, $-OC_5\text{-}C_{18}$ heteroaryl, $-NHC_1\text{-}C_{18}$ alkyl; or $-N(C_1\text{-}C_{18}$ alkyl$)_2$;

$R_2$ and $R_4$ are each independently $C_1\text{-}C_{18}$ alkyl, $C_2\text{-}C_{18}$ alkenyl, $C_2\text{-}C_{18}$ alkynyl, $C_3\text{-}C_{18}$ cycloalkyl, $C_3\text{-}C_{18}$ heterocycloalkyl, $C_5\text{-}C_{18}$ aryl, or $C_5\text{-}C_{18}$ heteroaryl;

each $R_7$ or $R_8$ is independently $C_1\text{-}C_{18}$ alkyl, $C_2\text{-}C_{18}$ alkenyl, $C_2\text{-}C_{18}$ alkenylene, $C_2\text{-}C_{18}$ alkynyl, $C_3\text{-}C_{18}$ cycloalkyl, $C_3\text{-}C_{18}$ heterocycloalkyl, $C_5\text{-}C_{18}$ aryl, $C_5\text{-}C_{18}$ arylene, $C_5\text{-}C_{18}$ heteroaryl, or $C_5\text{-}C_{18}$ heteroarylene, wherein each of $R_7$ and $R_8$ may be optionally substituted;

X is O, $NR_A$, or $S(O)_q$;

$R_A$ is $C_1\text{-}C_6$ alkyl, $C_3\text{-}C_{18}$ cycloalkyl, $C_3\text{-}C_{18}$ heterocycloalkyl, $C_5\text{-}C_{18}$ aryl, or $C_5\text{-}C_{18}$ heteroaryl; and q is 0-2; or (c) wherein each heterocyclic silane monomer is independently selected from the group consisting of

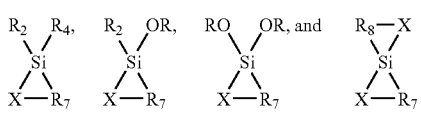

wherein each R is independently $C_1\text{-}C_{18}$ alkyl, $C_2\text{-}C_{18}$ alkenyl, $C_2\text{-}C_{18}$ alkynyl, $C_3\text{-}C_{18}$ cycloalkyl, $C_3\text{-}C_{18}$ heterocycloalkyl, $C_5\text{-}C_{18}$ aryl, $C_5\text{-}C_{18}$ heteroaryl, $C_6\text{-}C_{18}$ aralkyl, $C_6\text{-}C_{18}$ heteroaralkyl, $-Si(R^c)_4$, $-C(O)R^c$, $-C(S)R^c$, $-C(NR)R^c$, $-S(O)R^c$, $-S(O)_2R^c$, $-P(O)R^cR^c$, or $-P(S)R^cR^c$;

each $R^c$ is independently, H, $C_1\text{-}C_{18}$ alkyl, $C_2\text{-}C_{18}$ alkenyl, $C_2\text{-}C_{18}$ alkynyl, $C_3\text{-}C_{18}$ cycloalkyl, $C_3\text{-}C_{18}$ heterocycloalkyl, $C_5\text{-}C_{18}$ aryl, $C_5\text{-}C_{18}$ heteroaryl, $-OC_1\text{-}C_{18}$ alkyl; $-OC_5\text{-}C_{18}$ aryl; $-OC_3\text{-}C_{18}$ heterocycloalkyl, $-OC_5\text{-}C_{18}$ heteroaryl, $-NHC_1\text{-}C_{18}$ alkyl; or $-N(C_1\text{-}C_{18}$ alkyl$)_2$;

$R_2$ and $R_4$ are each independently $C_1\text{-}C_{18}$ alkyl, $C_2\text{-}C_{18}$ alkenyl, $C_2\text{-}C_{18}$ alkynyl, $C_3\text{-}C_{18}$ cycloalkyl, $C_3\text{-}C_{18}$ heterocycloalkyl, $C_5\text{-}C_{18}$ aryl, or $C_5\text{-}C_{18}$ heteroaryl;

each $R_7$ or $R_8$ is independently $C_1\text{-}C_{18}$ alkyl, $C_2\text{-}C_{18}$ alkenyl, $C_2\text{-}C_{18}$ alkenylene, $C_2\text{-}C_{18}$ alkynyl, $C_3\text{-}C_{18}$ cycloalkyl, $C_3\text{-}C_{18}$ heterocycloalkyl, $C_5\text{-}C_{18}$ aryl, $C_5\text{-}C_{18}$ arylene, $C_5\text{-}C_{18}$ heteroaryl, or $C_5\text{-}C_{18}$ heteroarylene, wherein each of $R_7$ and $R_8$ may be optionally substituted;

X is O, $NR_A$, or $S(O)_q$;

$R_A$ is $C_1\text{-}C_6$ alkyl, $C_3\text{-}C_{18}$ cycloalkyl, $C_3\text{-}C_{18}$ heterocycloalkyl, $C_5\text{-}C_{18}$ aryl, or $C_5\text{-}C_{18}$ heteroaryl; and q is 0-2.

21. The material of claim 1, wherein the material comprises particles.

22. The material of claim 21, wherein the particles are approximately spherical.

23. The material of claim 22, wherein the particles have: an average diameter of about 0.1 µm to about 300 µm; an average diameter of about 0.1 µm to about 60 µm; or an average diameter of about 1 µm to about 5 µm.

24. The material of claim 1, wherein the material has: a specific surface area of about 50-800 m²/g; a specific surface area of about 100-700 m²/g; or a specific surface area of about 100-300 m²/g.

25. The material of claim 1, wherein the material has specific pore volumes of about 0.2 to 2.5 cm³/g or about 0.4 to 1.5 cm³/g.

26. The material of claim 1, wherein the material has: an average pore diameter of about 20 to 600 Å; an average pore diameter of about 50 to 300 Å; or an average pore diameter of about 75 to 125 Å.

27. The material of claim 1, wherein the material is hydrolytically stable at: a pH of about 1 to about 14; a pH of about 10 to about 14; a pH of about 12 to about 14; a pH of about 1 to about 5; or a pH of about 1 to about 3.

28. The material of claim 1, wherein the material comprises a liquid chromatography stationary phase; a sequestering reagent; a solid support for combinatorial chemistry; a solid support for oligosaccharide, polypeptide, or oligonucleotide synthesis; a solid support for a biological assay; a capillary biological assay device for mass spectrometry; a template for a controlled large pore polymer film; a capillary chromatography stationary phase; an electrokinetic pump packing material; a polymer additive; a catalyst; or a packing material for a microchip separation device.

29. The material of claim 28, wherein the material comprises a HPLC stationary phase.

30. The material of claim 1, wherein the repeat unit D is
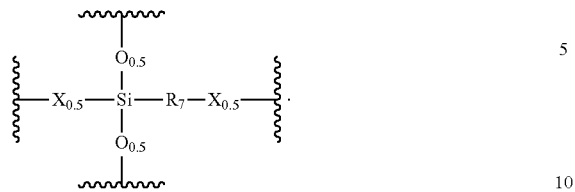
31. The material of claim 30, wherein $R_7$ is $C_1$-$C_{18}$ alkyl and X is O.
32. The material of claim 31, where in the organosilan repeat unit D is $H_2C{=}C(CH_3)CO_2C_3H_6Si(OCH_3)_3$ (3-(trimethoxysilyl)propyl methacrylate).
* * * * *